United States Patent [19]
Yoneyama et al.

[11] Patent Number: 5,570,150
[45] Date of Patent: Oct. 29, 1996

[54] STEREO PHOTOGRAPHING SYSTEM

[75] Inventors: Shuji Yoneyama; Shinya Suzuka, both of Tokyo, Japan

[73] Assignee: Asahi Kogaku Kogyo Kabushiki Kaisha, Tokyo, Japan

[21] Appl. No.: 298,391

[22] Filed: Aug. 30, 1994

[30] Foreign Application Priority Data

Aug. 30, 1993 [JP] Japan ..................... 5-213976

[51] Int. Cl.⁶ .............................. G03B 35/00; G03B 1/00
[52] U.S. Cl. ........................................... 396/324; 396/337
[58] Field of Search ...................... 354/110, 111, 354/112, 117, 122, 125, 219, 222, 224, 225, 75, 76, 79, 159, 94

[56] References Cited

U.S. PATENT DOCUMENTS

| | | | |
|---|---|---|---|
| 3,674,339 | 7/1972 | Satanagi | 354/122 |
| 3,815,970 | 6/1974 | Murphy | 355/22 |
| 4,009,951 | 3/1977 | Ihms | 354/117 |
| 4,295,153 | 10/1981 | Gibson | 358/88 |
| 4,707,106 | 11/1987 | Johnson et al. | 354/481 |
| 4,844,583 | 7/1989 | Lo | 354/174 |
| 4,878,744 | 11/1989 | Hilbert et al. | 350/447 |
| 5,073,789 | 12/1991 | Mumpowor | 354/122 |
| 5,349,403 | 9/1994 | Lo | 354/114 |

Primary Examiner—Michael L. Gellner
Assistant Examiner—Nicholas T. Tuccillo
Attorney, Agent, or Firm—Kane, Dalsimer, Sullivan, Kurucz, Levy, Eisele and Richard, LLP

[57] ABSTRACT

A stereo photographing system having a stereo adapter for photographing two separate images of a same subject viewed from different points and formed onto one picture frame next to each other, and a camera including a finder and a photographing lens to which the stereo adapter can be detachably attached at the front end of the photographing lens. The stereo photographing system further includes a finder viewing field determining means provided in an optical path of the finder for selectively determining either a regular viewing field or a stereo viewing field, a detecting means which detects the stereo adapter when the stereo adapter is mounted to the camera, and a switching means which swatches between the regular viewing field and the stereo viewing field determined by the viewing field determining means in accordance with the detecting means.

34 Claims, 23 Drawing Sheets

STEREO PHOTOGRAPHING SYSTEM

BACKGROUND OF THE INVENTION

1. Field of Invention

The present invention relates to a stereo photographing system including a stereo adapter used for stereo photography and a camera to which the adapter can be detachably fitted.

2. Description of Related Art

According to FIG. 27, a known stereo photographing system principally works as follows. The stereo adapter 12 has a photographing lens 11 attached at the front. The stereo adapter includes the secondary mirrors 13a and 13b which are held at specific angles to the lens axis and primary mirrors 14a and 14b which are placed substantially parallel to the secondary mirrors. The light rays from the subject 15 awe split by the primary 14a, 14b and secondary mirrors 13a, 13b then projected through lens 11 onto a picture frame 16 (film) giving a resultant image of a width d. The images of the picture frame can be observed as a three-dimensional image when split images 15a and 15b are observed by both eyes separately.

When the known stereo adapter (called hereinafter simply the adapter) is attached on a lens-shutter type camera,the finder viewing field mismatches because the photographing area becomes horizontally narrower while the finderviewing field stays the same.

Furthermore, stereo photography with this type of adapter makes vertically long pictures because a pair of images of the same subject are made on the right and left portions of the same picture frame and therefore often gives observers less realistic visual feeling.

With conventional adapters, the camera must be set at a certain lens focal length, the subject must be at certain limited distance, the lens aperture must be stopped down to certain limited opening and must satisfy various other photographing conditions due to the arrangement of the adapter. Because of such limitations, the conventional adapters were not suitable with lens-shutter type cameras equipped with automatic exposure Control, automatic focusing and/or power zoom lenses. Even more importantly conventional adapters can not be applied to fully automatic zoom-lens type cameras. For this reason, there has been no such an adapter available for a lens-shutter type cameras.

SUMMARY OF THE INVENTION

The object of the present invention is to provide a stereo picture photographing system which does not cause a mismatching of the viewfinder field with the actual photographing area when an adapter is attached to the lens of a lens-shutter type camera and thus solves the problems described above, which occur in conventional equipment.

Another object of the present invention is to provide a stereo photographing system which provides realistic 3D where the image size appears to be the same size as if the photographic image had taken up the full frame.

Still another object of the present invention is to provide a fully automated stereo photographing system with a lens-shutter type camera having an automatic exposure control, automatic focusing and a power zoom lens automatically setting the picture taking conditions required by such a stereo photographing system when the adapter is fitted on the camera.

According to the present invention, there is provided a stereo photographing system, having a stereo adapter for photographing two separate images of a same subject viewed from different points and formed onto one picture frame next to each other, and a camera including a finder and a photographing lens to which said stereo adapter can be detachably attached at the front end of said photographing lens, an the system comprises a finder viewing field determining means provided in an optical path of the finder for selectively determining either a regular viewing field or a stereo viewing field, a detecting means which detects the stereo adapter when the stereo adapter is mounted to the camera; and, a switching means which switches between the regular viewing field and the stereo viewing field determined by the viewing field determining means in accordance with the detecting means.

As one of aspects of the present invention, there is proveded a stereo photographing system having a stereo adapter for photographing two separate images of a same subject viewed from different points and formed onto one picture frame next to each other, and a camera including a finder and a photographing lens to which said stereo adapter can be detachably attached at the front end of said photographing lens, wherein said stereo adapter comprises a stereo finder viewing field determining means which is formed integral to the stereo adapter and placed in front of the finder when the stereo adapter is mounted to the camera.

According to the present ivnetion, there is provided a stereo photographing system comprises a stereo adapter for photographing two separate images of a same subject viewed from different points and formed in one picture frame next to each other, a camera including a finder and a photographing lens to which the stereo adapter can be detachably attached at the front end of said photographing lens, and a picture size switching means which can selectively switch a picture size between a regular size and a horizontally long picture size whose horizontal to vertical ratio is different from the regular size, a means for detecting that the stereo adapter is mounted on a camera; and, a means for actuating the picture size switching means to alter said picture size to a horizontally long picture size when the detection means detects that the stereo adapter is mounted to the camera.

According to another aspect of the present invention, there is provided a stereo photographing system having a stereo adapter for photographing two separate images of a same subject viewed from different points and formed onto one picture frame next to each other, and a camera including a finder and a photographing lens to which said stereo adapter can be detachably attached at the front end of said photographing lens, wherein the stereo adapter, comprises a pair of primary reflecting members for reflecting light from the same subject; and, a pair of secondary reflecting members for reflecting light reflected by the primary reflecting members toward the photographing lens, wherein the primary reflecting members are provided in a manner such that said primary reflecting members are rotatable about axes parallel to each other and each of the axes extending in a direction perpendicular to an imaginary plane which an optical axis of the photographing lens is located on and is perpendicular to the pair of secondary reflecting members to change an angle of an incident light reflected by the primary reflecting members upon the secondary reflecting members.

According to sitll another aspect of the present ivention, there is provided a stereo photographing system having a stereo adapter for photographing two separate images of a same subject viewed from different points and formed onto one picture frame next to each other, and a lens-shutter type camera including a finder and a photographing lens to which said stereo adapter can be detachably attached at the front end of said photographing lens, wherein the lens-shutter type camera further comprises a means for measuring a distance of a subject, a focusing means for bringing the photographing lens into an in-focus state in accordance with the subject distance measured by the distance measuring means, a means for detecting that the stereo adapter is mounted onto the lens-shutter type camera, and, a means for adding a certain distance factor to the subject distance measured by the distance measuring means and for controlling the focusing means to bring the photographing lens into an in-focus state in accordance with an adjusted subject distance equal to the certain distance factor plus the subject distance which is obtained by the adding means, when the detecting means detects that the stereo adapter is mounted to the lens-shutter type camera.

According to further aspect of the present invention, there is provided a stereo photographing system having a stereo adapter for photographing two separate images of a same subject viewed from different points and formed onto one picture frame next to each other, and a lens-shutter type camera including a finder and a photographing lens to which said stereo adapter can be detachably attached at the front end of said photographing lens, wherein the the lens-shutter type camera further comprises a distance measuring means including a light emitter and a light receiver for measuring a distance of a subject by projecting an infrared ray upon the subject from the light emitter and receiving a reflected infrared ray from the subject by the light receiver, a refracting member for refracting a light path of the reflected infrared ray which is provided in a manner such that the refracting member can be inserted into and retracted from a front of the light receiver, a means for inserting and retracting the refracting member into and from the front of the light receiver, a means for detecting that the stereo adapter is mounted to the lens-shutter type camera; and, a means for actuating the inserting and retracting means to insert the refracting member into the front of the light receiver when the detection means detects that the stereo adapter is mounted to a lens-shutter type camera.

As one of the aspects of the present invention, there is provided a stereo photographing system having a stereo adapter for photographing two separate images of a same subject viewed from different points and formed onto one picture frame next to each other, and a lens-shutter type camera including a finder and a photographing lens to which the stereo adapter can be detachably attached at the front end of said photographing lens, wherein the lens-shutter type camera further comprises a distance measuring means including a light emitter and a light receiver for measuring a distance of a subject by projecting an infrared ray upon the subject from the light emitter and receiving a reflected infrared ray from the subject by the light receiver, and wherein the stereo adapter comprises a refracting member for refracting a light path of the reflected infrared ray which is formed integral on the stereo adapter positioned in front of the light receiver when the stereo adapter is mounted to the lens-shutter type camera.

As still another aspect of the present invention, there is provided a stereo photographing system having a stereo adapter for photographing two separate images of a same subject viewed from different points and formed onto one picture frame next to each other, and a camera including a finder and a photographing lens to which the stereo adapter can be detachably attached at the front end of the photographing lens, wherein said camera further comprises an automatic focusing means for determining a focusing distance, a means for detecting that the stereo adapter is mounted to the camera, and, a means for fixing the focusing distance determined by the automatic focusing means at a predetermined distance when the detector detects that the stereo adapter is mounted to the camera.

According to further aspect of the present invetion, there is provided a stereo photographing system having a stereo adapter for photographing two separate images of a same subject viewed from different points and formed onto one picture frame next to each other, and a camera including a finder and a photographing lens to which said stereo adapter can be detachably attached at the front end of said photographing lens, wherein the camera further comprises an automatic exposure control means including a diaphragm, a means for detecting that the stereo adapter is mounted on the camera: and, a means for controlling the automatic exposure control means to stop down said diaphragm to a certain size corresponding to a predetermined f-number when the detector detects that the stereo adapter is mounted on the camera.

The present disclosure relates to subject matter contained in Japanese patent application No. Hei 5-213976 (filed on Aug. 30, 1993) which is expressly incorporated herein by reference in its entirety.

DETAILED DESCRIPTION

Figure 1:
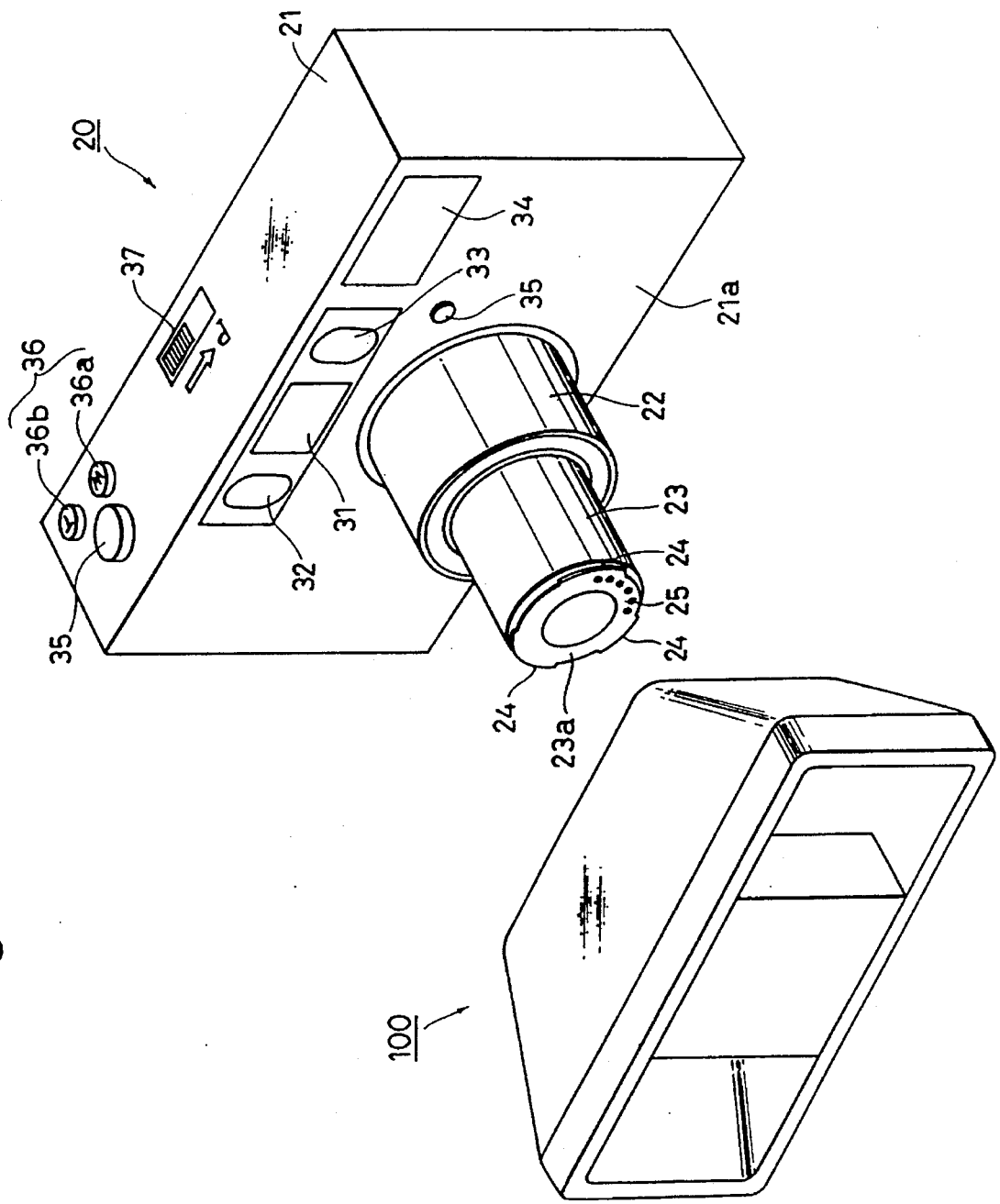
FIG. 1 is a perspective view of the camera and the adapter formed in accordance with the present invention.
Figure 2:
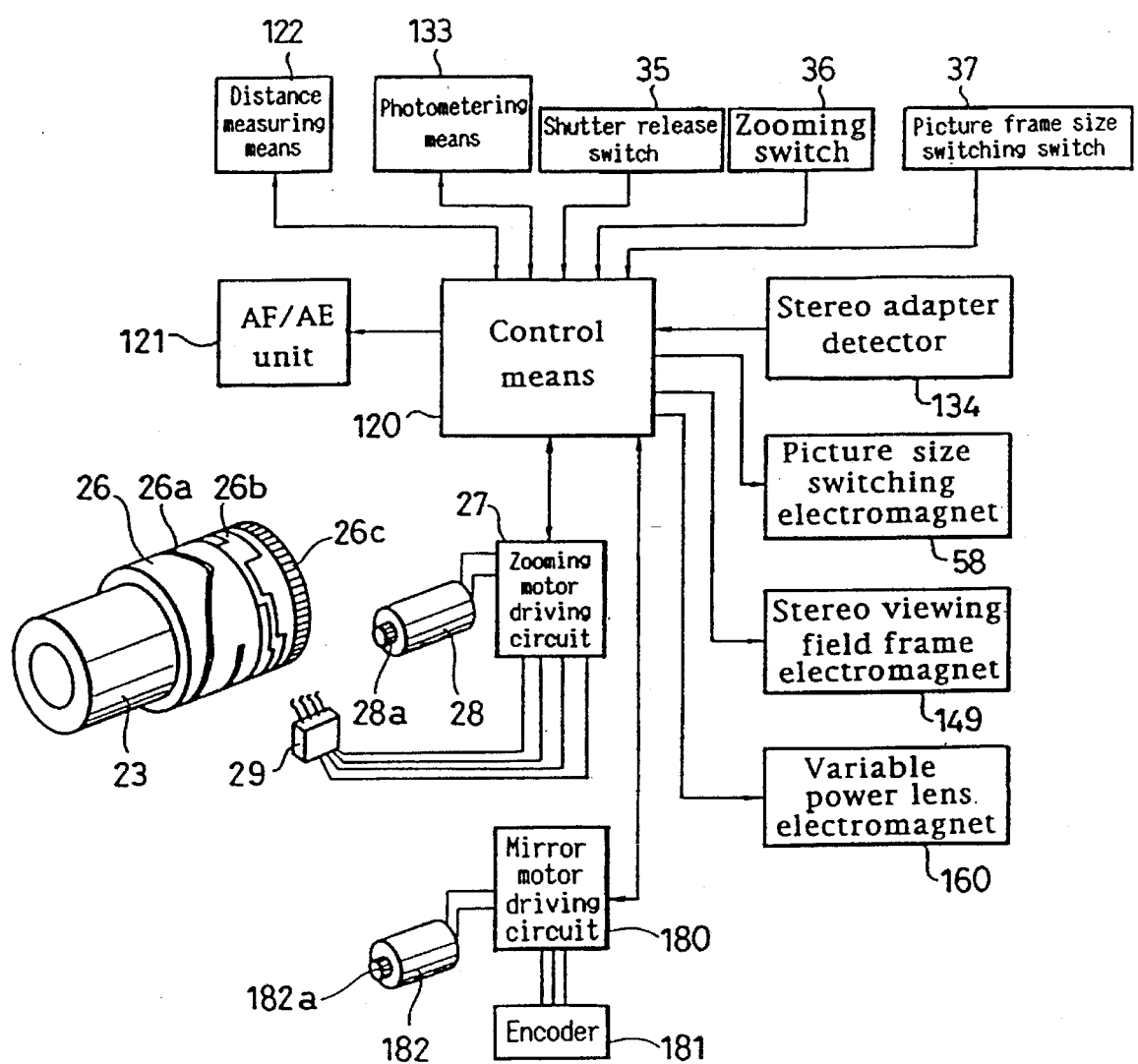
FIG. 2 is a schematic diagram of the camera control system of the camera formed in accordance with the present invention and perspective view of a lens barrel.

The present invention will be discussed according to an embodiment with accompanying drawings below. FIG. 1 is an perspective view of a camera 20 and an adapter 100 which are fitted together in accordance with the present invention. The camera 20 is a zoom lens incorporating a lens-shutter type camera equipped with an automatic exposure Control, an automatic focusing, a power zoom lens and a picture frame size switching mechanism. FIG. 2 is a block diagram of the control system of said camera 20, with an perspective view of a lens barrel.

The camera 20 is provided with a fixed lens mount 22, which is attached to the front of the camera body 21, and an extending and retracting zoom lens barrel 23, which is activated by the zooming switch 36. The zoom lens barrel 23 is mounted inside the fixed lens mount 22. The zoom lens barrel 23 is driven by a known mechanical arrangement which includes cam pins,( not shown). These cam pins fit into cam grooves 26a of a cam ring 26 which is rotatively driven by a zooming motor 28 shown in FIG. 2. Between the driving pinion 28a of the motor 28 and the circumferential gear 26c, formed at the end of said cam ring 26, there is a reduction gear train (not shown). The zoom motor driving circuit 27 drives the zooming motor 28 in order to extend the zoom lens barrel 23 to a predetermined focal length by means of the control means 120 which includes microcomputers, for examining the position of the zoom lens barrels by detecting the rotating position of the cam ring 26 with the zoom brush 29 which contacts with the pattern 26b printed on the circumference of the cam ring 26.

On the upper front wall 21a of the camera body 21, there is a viewfinder objective window 31. On sides of the finder objective window 31, there is provided an active infrared autofocus detector comprising a infrared light emitter 32 and a infrared light receptor 33. Also on the front wall 21a, there is an electronic flash head 34 and a light meter window 35 having a light sensor inside it, not shown.

A shutter release button 90 is placed at one end of the top of the camera body 21 and at the back of it there is the zooming switch 36 which varies the focal length of the camera's objective lens. The zooming switch 36 comprises a wide angle zoom switch 36a which moves the focal length towards the wade angle settings and a telephoto zoom switch 36b which moves the focal length towards the tele settings. A picture frame size switch 37 which activates the picture frame size switching mechanism 40 (shown in FIG. 3 to FIG. 5) of the camera 20 is located at the center of the top of the camera body 21. The switch 37 changes the picture frame size between a regular frame measuring 24 mm×36 mm and a panorama frame measuring 13 mm×36 mm by sliding its position.

Figure 3:
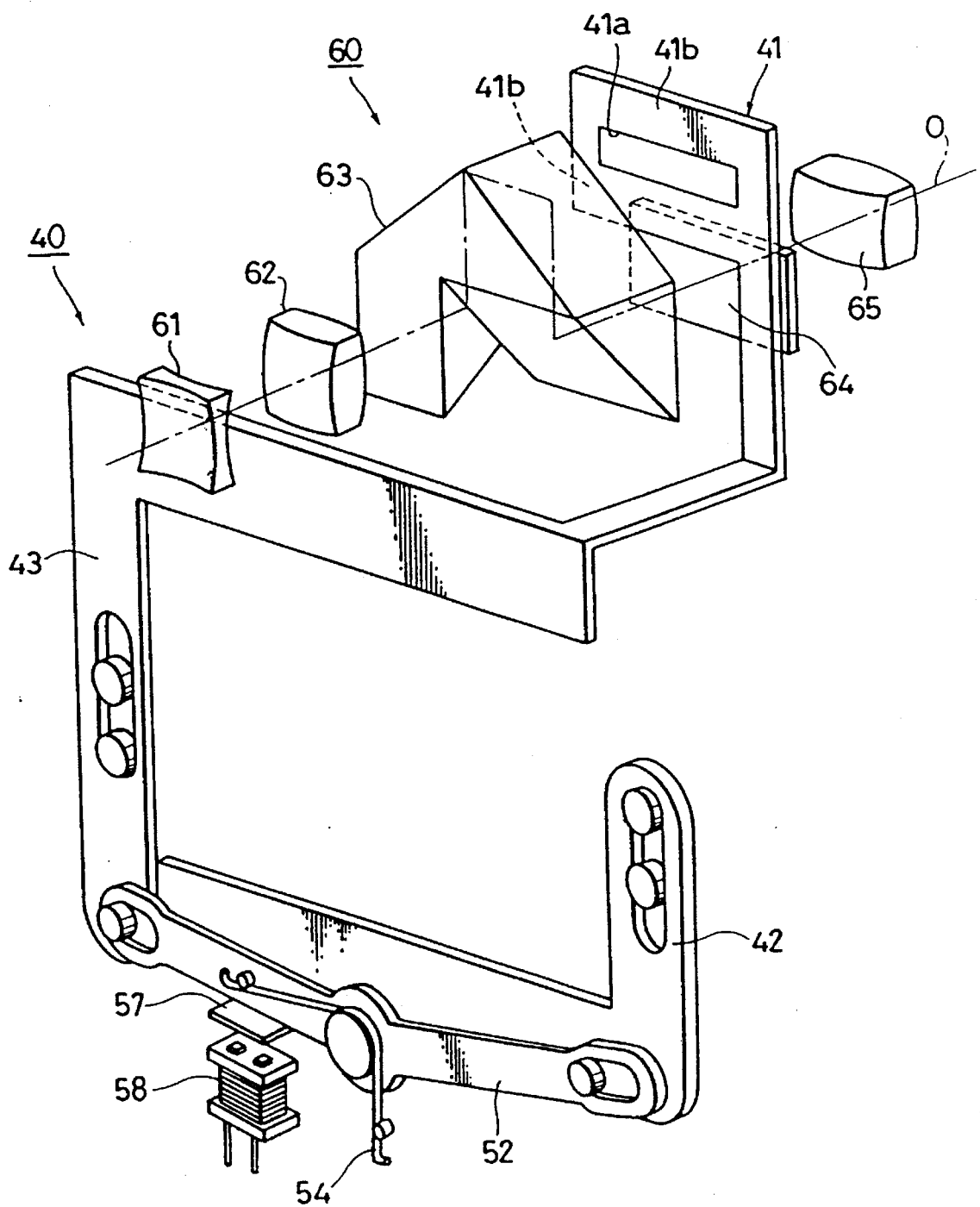
FIG. 3 is a perspective view of the finder optics arrangement and the frame-size switching mechanism of the camera formed in accordance with the present invention.

FIG. 3 shows the picture frame size altering mechanism 40 installed in the camera 20 and the finder optics 60. The real image finder optics 60 includes, from the objective side, movable lenses 61 and 62 which serve as objective lens elements, an image erecting prism 63 which serves as an image erector, a regular frame size viewfinder frame 64 having a regular picture frame size and an eyepiece element 65 which serves as an eyepiece optics. The finder magnifications are determined by moving the movable lens 61 and 62 along the optical axis O in a predetermined relationship to each other.

A panorama viewfinder frame 41 which indicated the panoramic viewing field of view while in the panorama mode and formed integral with the picture size determining plate 43, which is a part of the picture size switching mechanism 40, is inserted between the viewfinder field frame 64 end the light exiting surface of the image erecting prism 63 in retractable way. The panorama finder frame 41 is a masking means which shields off corresponding portions of the upper and lower viewing field determined by the viewfinder frame 64 and operated by the picture frame size switching mechanism 40. The picture frame size switching mechanism 40 will be discussed below.

Figure 4:
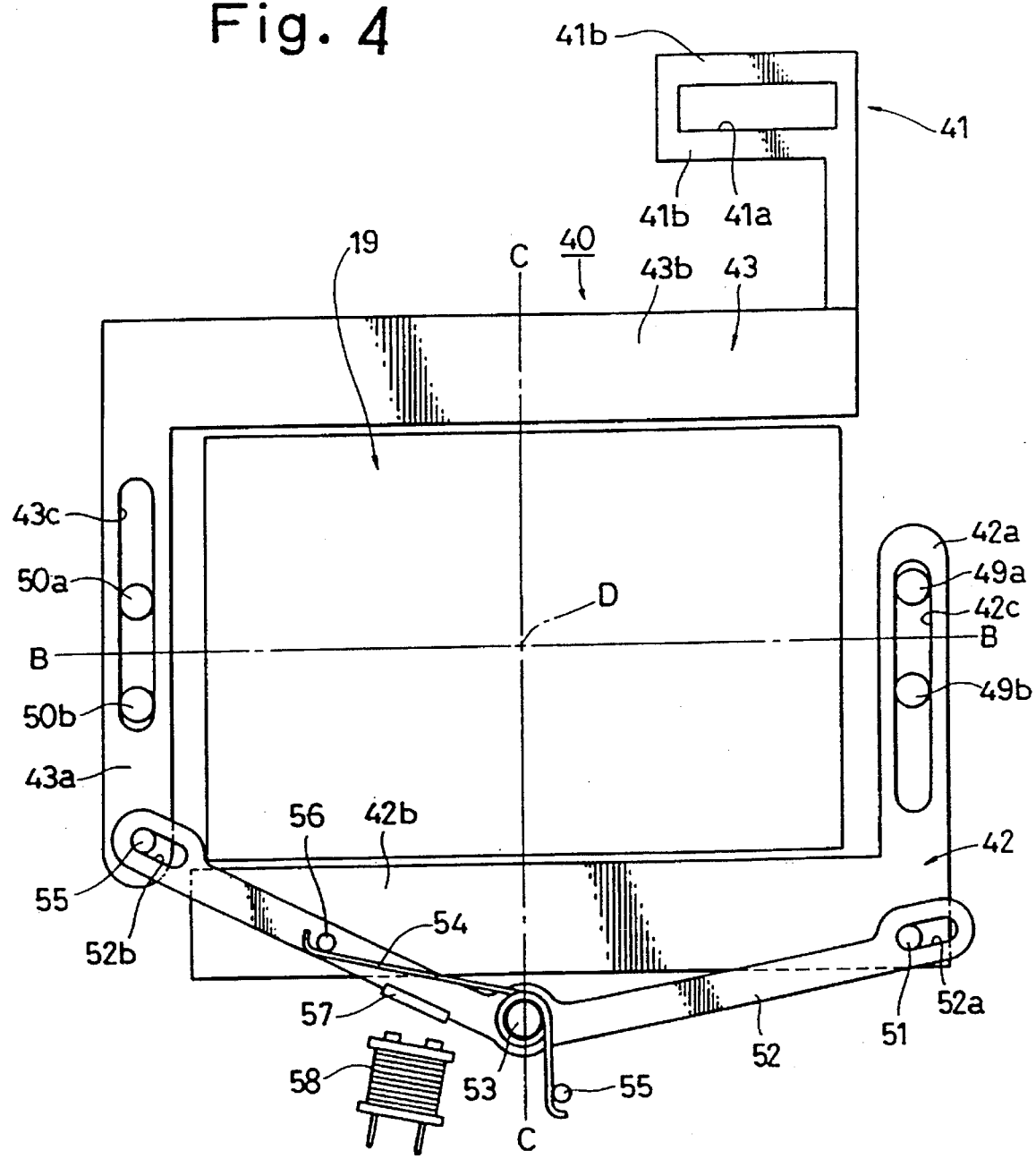
FIG. 4 is a front elevational view of the frame-size switching mechanism at regular frame size position setting.
Figure 5:
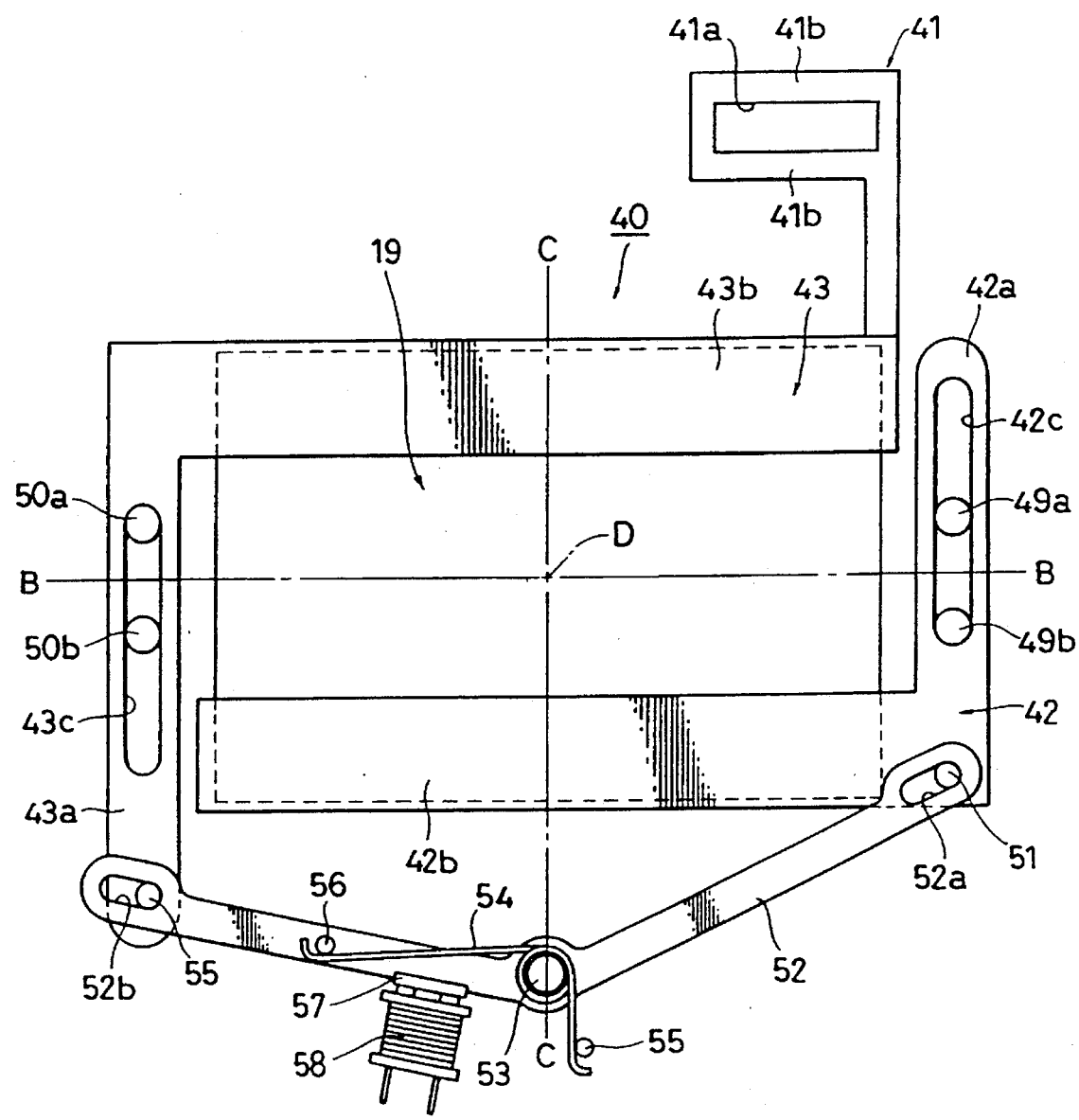
FIG. 5 is a front elevational view of the frame-size altering mechanism set at panorama frame size position setting.

The picture frame size switching mechanism 40, as shown in FIG. 4 and FIG. 5, includes a pair of "L" shaped picture size masking plates 42 and 43. These mask the film aperature 19 of the camera 20. The picture size masking plate 42 includes a guide bar 42a and a masking plate 42b structured perpendicular to each other. Similarly, the picture size masking plate 43 includes a guide bar 43a and a masking plate 43b which are substantally pendicular to each other. The picture size masking plate 43 also includes the aforementioned panorama viewing field frame 41 which is formed integral to its upper edge. The panorama viewing field frame 41 has an opening 41a which determines the viewing field corresponding to the panorama picture size. The masking area 41b masks off upper and lower portions of the regular finder viewing field as the opening 41a inserted by an up and down movement.

The picture size masking plate 42 has a guiding slot 42c longways on its guide bar 42a. A pair of guide pins 49a and 49b fixed to a stationary portion (not shwon) on the camera body 21. The picture size masking plate 42 moves upward and downward in relation to the film aperture 19, guided by the pans 49a and 49b in the slot 42c.

The picture size masking plates 42 and 43 are arranged point symmetrically about the intersecting point between the vertical center line B—B and the horizontal center line C—C of the film aperture 19 and form a rectangular opening corresponding to the film aperture.

The picture size masking plate 43 has a guiding slot 43c longways on its guide bar 43a. A pair of guide pins 50a and 50b fixed to a stationary portion (not shown) on the camera body 21. The picture size masking plate 43 moves upward and downward in relation to the film aperture 19, guided by the pins 50a and 50b in the slot 43c.

The picture size masking plate 42 has a fixed pin 51 at the corner between the guide bar 42a and the masking plate 42b. The picture size masking plate 43 has a fixed pin 55 at the bottom end of the guide bar 43a. A pivoting linking lever 52 is rotatably supported on a pivot-center pin 53 fixed to a stationary portion (not shown) of the camera body 21, and the through hole 52a at one end of the linking lever 52 is fitted to the fixed pin 51 while another through hole 52b at the other end of the linking lever 52 is fitted to the fixed pin 55. A coil spring 54 is fitted around the pivot-center pin 53 end one end of the coil spring 54 contacts with the fixed pin 55 fixed to a stationary portion (not shown) of the camera body 21, and the other end contacts with a fixed pin 56 of the linking lever 52. The linking lever 52 is tensioned by the spring 54 clockwise direction on its pivoting center pin 53 and rotates and is free to move until the upper end of the slot 42c contacts the guide pin 49a and at the same time the lower end of the long straight through hole 43c hits the guide pin 50b. The shape and the position of the linking lever 52 and the pivoting center pin 53 are determined by the amount of vertical movement of the picture size masking plate 42.

As shown in FIG. 4, the panorama viewfinder frame 41 retracted from the optical path of the finder, between the regular frame size viewfinder frame 64 and the image erecting prism 63 facing the viewfinder frame 64 when the picture size masking plate 43 is located in the upper position. This corresponds to the regular picture size. When the picture size masking plate 43 moves downward, as shown in FIG. 5, the panorama viewfinder frame 41 is inserted in the optical path between the regular frame size viewfinder frame 64 and the image erecting prism 63 facing said viewfinder frame 64 to position the masking area 41b of the finder opening 41a over the regular viewfinder field and to switch the viewfinder field to a smaller size corresponding to the panorama viewing field.

An electromagnet 58 which is magnetized and demagnetized by the control means 120, shown in FIG. 2, activated by the picture size altering switch 37, is fixed to a stationary portion (not shown) of the camera body also there is an armature 57 made from such materials as iron fixed at the opposite to the electromagnet on the linking lever 52. When the electromagnet 58 is energized, it attracts the armature 57 and rotates the linking lever 52 counterclockwise, as shown in FIG. 4, the picture size masking plate 42 moves upward from the position shown in FIG. 3, and the picture size masking plate 43 moves downward from the position shown in FIG. 4 and inserts the mask plate 42b and 43b into the film aperture to alter the picture size to the panorama size.

Figure 6:
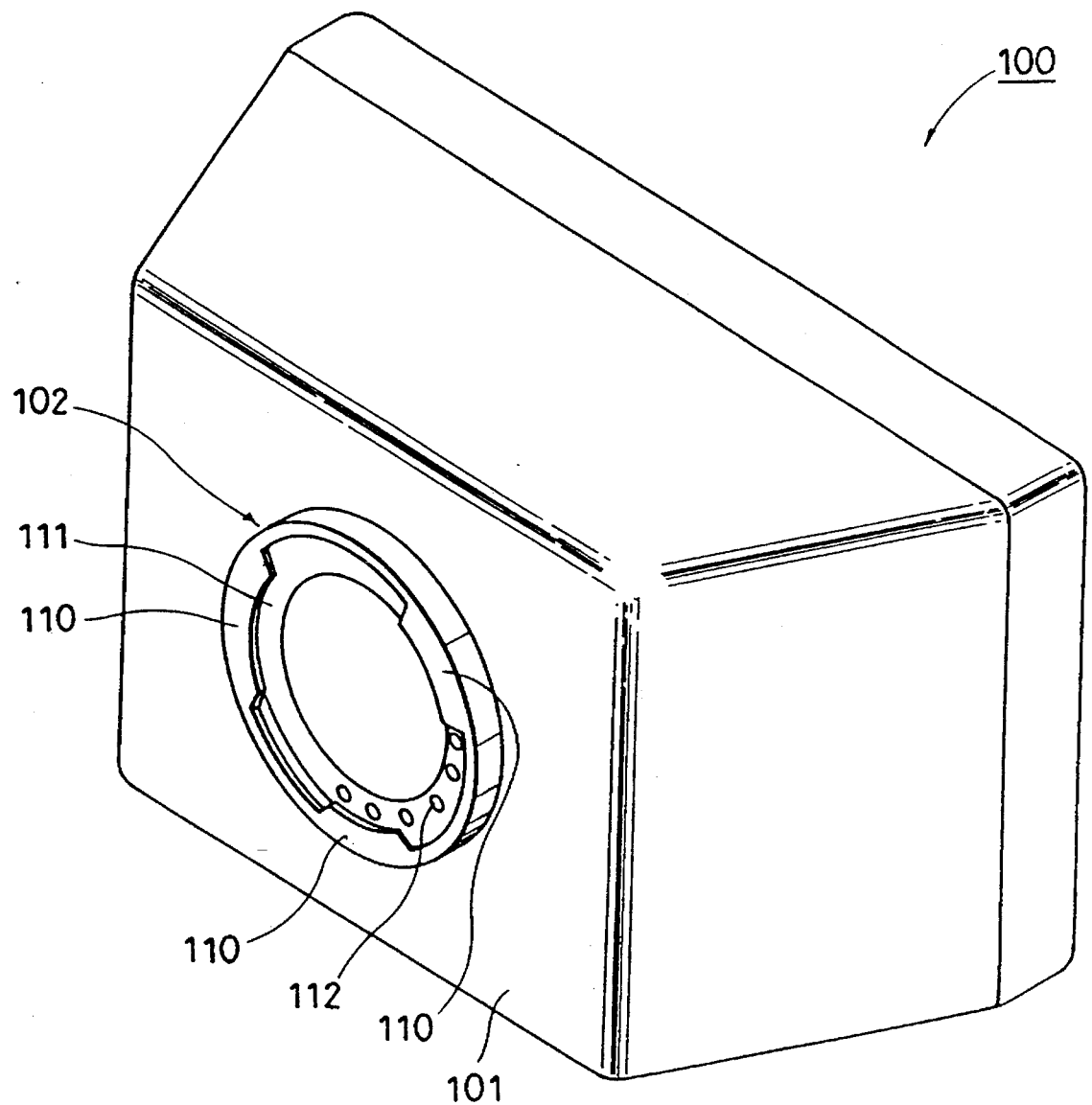
FIG. 6 is a rear perspective view of the stereo adapter formed in accordance with the present invention.
Figure 7:
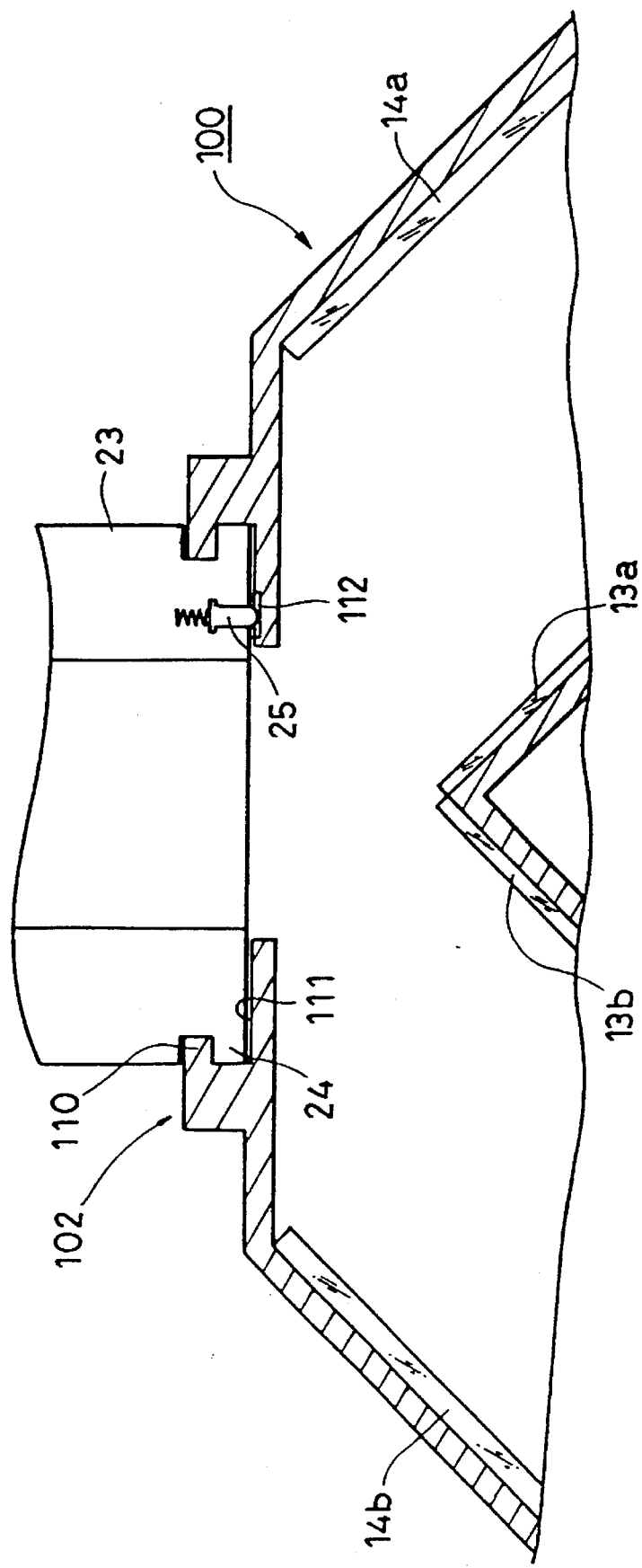
FIG. 7 is a top sectional view of the stereo adapter and its lens mounting mechanism formed in accordance with the present invention.

The front end 23a of the zoom lens 23 and the adapter 100 have known bayonet mounts to be detachably attached to each other as shown in FIG. 1, FIG. 6 end FIG. 7. There are connecting flanges 24 at the circumferential edge of the front end 23a of the zoom lens 23. On the back wall 101 of the adapter 100, there is a connector 102 which interlocks with the front end 23a of the zoom lens 23. The connector 102 includes a mount base 111 to which the front face of the connecting flange 24 contacts and the same number of connecting flanges 110 as the connecting flanges 24, positioned slightly behind the mount base 111. The adapter 100 is mounted on the camera 20 by interlocking the number of connecting flanges 110 with the connecting flanges 24 on the zoom lens barrel 23.

There are a number of electrical contact pins 25 projected from the front end 23a of the zoom lens barrel 23. When the adapter 100 is mounted on the front end 23a of the zoom lens barrel 23, the electrical contact pins 25 make an electrical contact with a number of electrical contacts 112 formed on the mounting base 111 of the connector 182. The electrical contacts pins 25 and electrical contacts 112 serve to detect the presence of the adapter 100 attached to the camera 20, using the stereo adapter detector 134, to transmit the mirror adjusting angle information generated by an encoder 181 formed on the adapter 100 to the mirror driving motor circuit and to supply power to the mirror driving motor of the adapter from the camera 20.

Figure 8:
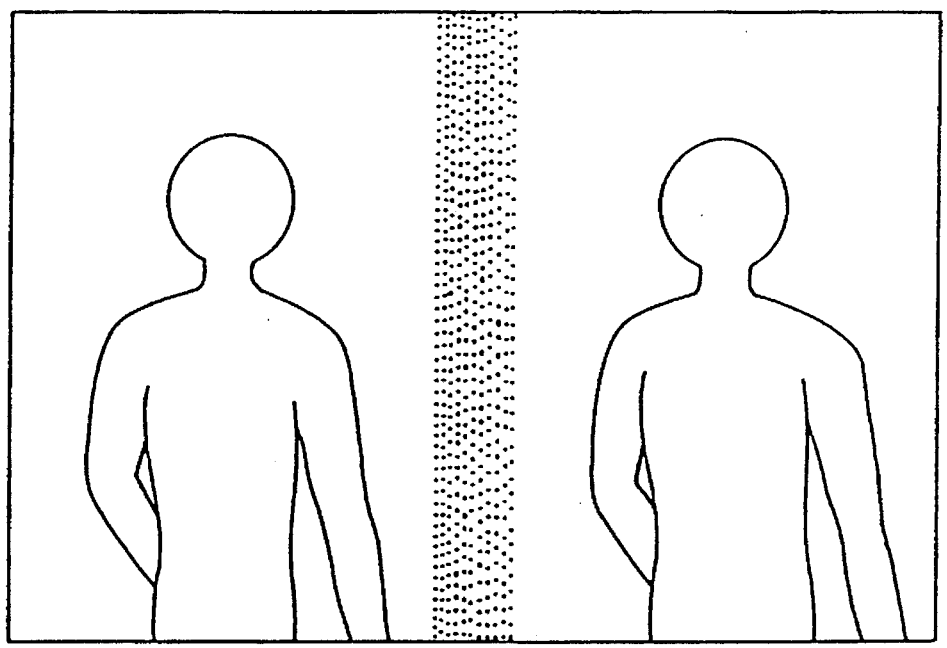
FIG. 8 is a drawing to show the conventional stereo pictures with which both left and right picture frames are vertically long.

With the camera 20 made in accordance with the present invention, the picture size frame is switched to the panorama size by moving the switch 37 or by energizing the electromagnet 58 of the picture frame size altering mechanism 40 when the stereo adapter detector 134 detects the mounted adapter 100. Stereo pictures are then taken by the camera in this position. The switching action is controlled by the control means 120. The stereo photographs taken by this process applied in accordance with the present invention provides a pair of photographs which are more realistic in their visual appearance by being horizontally long rather than the conventional stereo photography, as shown in FIG. 8, which makes a pair of vertically long images of the same subject in a regular picture frame. Incidentally, the stereo photographic method can be applied not only to a lens-shutter type camera but also to a single-lens-reflex camera.

Figure 10:
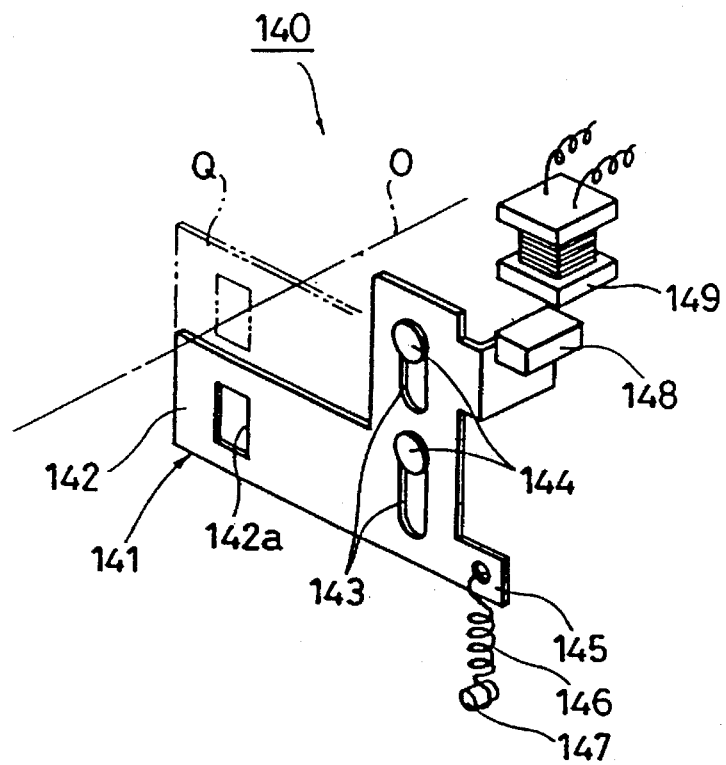
FIG. 10 is a perspective view of the stereo viewing field switching mechanism.

The camera 20 provides a viewfinder field switching mechanism 140 as shown in FIG. 10. This viewfinder field switching mechanism 140 is located in the vicinity of the finder optics 60 of the camera 20 having a stereo viewing field plate 141 positioned essentially parallel with the panorama viewfinder frame 41. The viewfinder field switching mechanism 140 is not shown in FIG. 3.

The stereo viewing field plate 141 includes a pair of vertical slots 143. The plate 141 can move up and down within the length of the vertical slot 143 held and guided by the fixed guide pins 144 fixed to a stationary portion (not shown) of the camera body 21. The stereo viewing field plate 141 is constantly tensioned downward by a tension spring 146 applied between a pin 147 fixed to a stationary portion (not shown) of the camera body 21, and one end 145 of the plate 141. The stereo viewing field plate 141 also includes a mask, or a stereo picture viewing field frame 142 which can be inserted in or retracted from the finder optical path. In the stereo viewing field plate 141, there is an opening 142a which corresponds to the stereo picture size, the size of each of the picture of two images made on a film side by side of the same subject by stereo picture photographing.

Fixed to a stationary portion (not shown) of the camera body 21 is an electromagnet 149 which is energized by the control means 120 when the control means 120 receives the information from the stereo adapter detector 134 when it detects the mounted adapter 100. An armature 148 made of iron or other similar materials is fixed to the stereo viewing field plate 141 corresponding to the electromagnet 149. When the electromagnet 149 is not energized, the stereo viewing field plate 141 is retracted from the finder optical path and located at the low position as shown in FIG. 10. When energized, the electromagnet 149 attracts the armature 148 which resists against the tensioning power of the tension spring 146 and insert the mask 142 into the finder optical path up to the position Q indicated by the phantom lines in FIG. 10 to switch the finder viewing field to the size corresponding to the stereo picture size.

Figure 12:
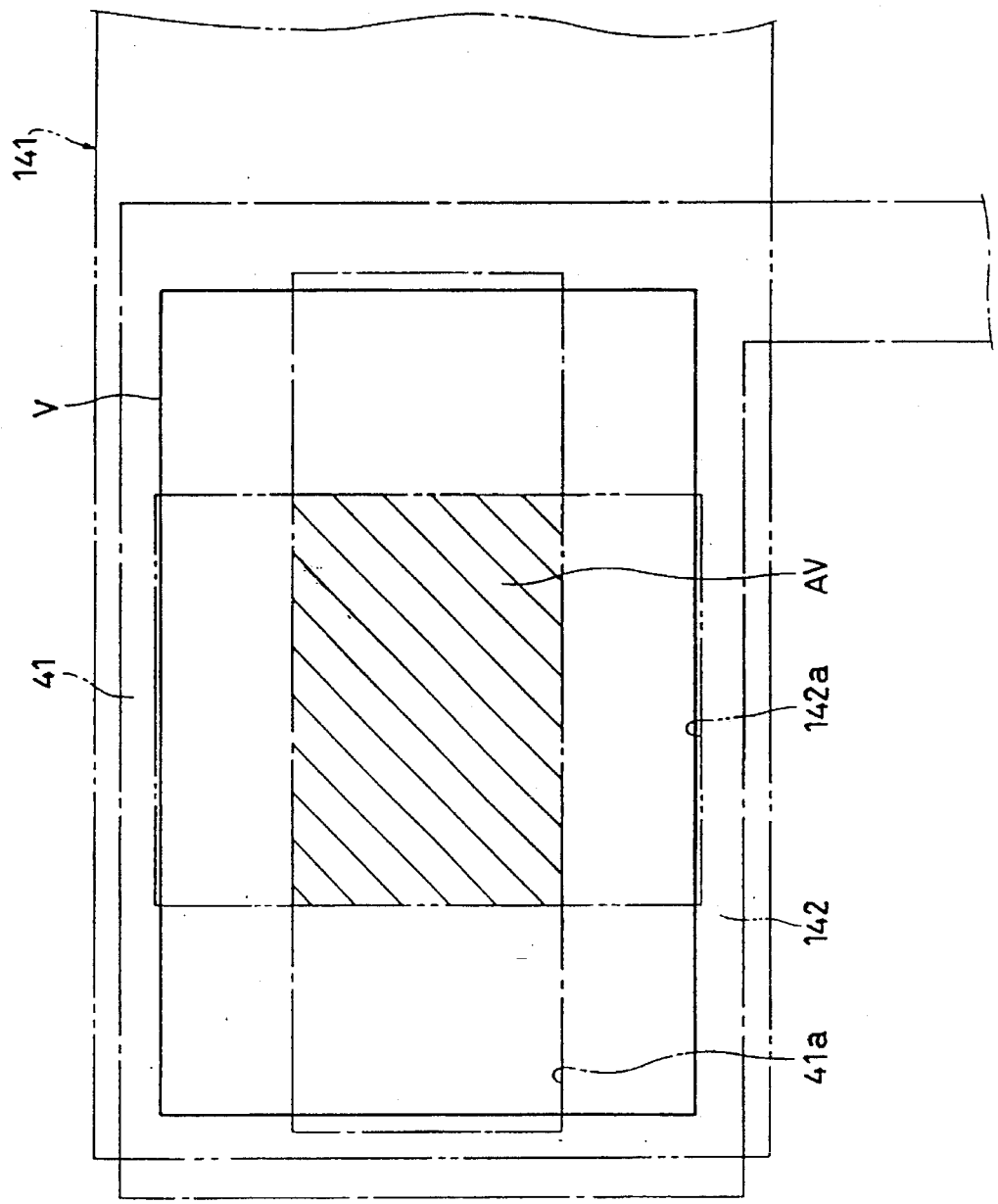
FIG. 12 is a schematic view of the stereo finder viewing field.

With the arrangement described above, the viewfinder field for the stereo photography in accordance with the present invention is the area AV in FIG. 12 indicated by the hatching. The area AV is formed as a result of overlap of the panorama viewfinder frame 41 and the mask 142 of the stereo viewing field plate 141. In this state, the viewfinder field V corresponding to the regular picture frame size is masked vertically by the opening 41a and horizontally by opening 142a, also as indicated in FIG. 12. The arrangement mentioned above in which the viewfinder field and the actual picture frame area match each other, thus errors in framing of the photographing area can be eliminated.

In another embodiment of the present invention, there is provided with a viewfinder field masking member 103, which formes the finder view of the stereo photography, integrally formed on the adapter 100, extending towards the camera 20, from the top back end of the adapter 100. When the adapter 100 is attached to the camera 20, an opening 104a in the center of the masking plate 104 of the masking member 103 is placed in front of the viewfinder objective window 31 of the camera 20. The opening 104a serves the same function as the above mentioned opening 142a of the stereo picture viewing field frame 142. The masking means 104 is so formed that it does not hit the viewfinder objective window 31 with the zoom lens barrel 23 at its most retracted position.

Although the aforementioned embodiments describe the stereo viewfinder field masking member 103 and the stereo picture viewing field frame 142 applications, the stereo viewfinder frames are not limited by these examples. Such stereo viewfinder frames can be any other arrangements which can visually show the viewing field in the viewfinder corresponding to the stereo photograph taking area. The peripheral area of the stereo viewing field in the regular frame size viewfinder frame 64 can be masked by a liquid crystal display which is not energized and thus kept transparent when the stereo adapter detector 134 does not detect the mounted adapter 100 and if the stereo adapter detector 134 detects the adapter 100 the liquid crystal display is energized and becomes opaque or translucent. Yet another example of the stereo viewfinder frame formed in accordance with the present invention is a transparent plate with frame lines to indicate the position Of the stereo photographing area, this is arranged to be inserted in and retracted from the viewfinder optical path such that when the stereo adapter detector 134 does not detect the adapter 100 the transparent plate is retracted from the viewfinder optical path and If the stereo adapter detector 134 detects the adapter 100, the transparent plate is inserted in the viewfinder optical path.

Figure 11:
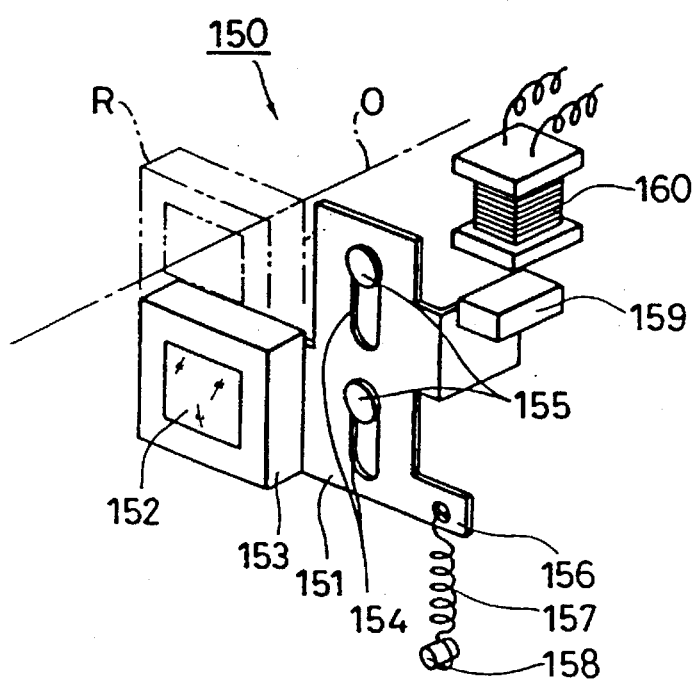
FIG. 11 is a perspective view of the stereo viewing magnification altering mechanism.

The camera 20 comprises a stereo viewing field varying mechanism 150 as shown in FIG. 11. The viewfinder field varying mechanism 150 is positioned in the vicinity of the viewfinder optics 60 of the camera body 20 as in the case of the stereo viewfinder field switching mechanism 140 and is arranged to insert and retract a variable power lens 152 in the viewfinder optical path between the regular frame size viewfinder frame 64 and the eyepiece 65. The stereo viewing field varying mechanism 150 is not shown in FIG. 3.

The variable power lens 152 is a magnifying lens held by a lens frame 153. It enlarges the viewing field AV shown in FIG. 12 to approximately the size of the finder viewing field V. The lens frame 153 is fixed to the vertically movable plate 151. The plate 151 can move up and down within the length of the vertical slot 154 held and guided by the coupled fixed guide pins 155 fixed to a stationary portion (not shown) of the camera body 21. The stereo viewing field plate 151 is constantly tensioned downward by a tension spring 157 applied between a pin 158 fixed to a stationary portion (not shown) of the camera body 21 and one end 156 of said plate 151.

Fixed to a stationary portion of the camera body 21 is an electromagnet 160 which is energized by the control means 120 when the control means 120 receives the information from the stereo adapter detector 134 when it detects the mounted adapter 100. An armature 159 made of iron or other such material is fixed to the movable plate 151 at the position corresponding to the electromagnet 160. When the electromagnet 160 is not energized, the movable plate 151 retracts the variable power lens 152 from the finder optical path and positions it at the low position as shown in FIG. 11. When energized, the electromagnet 160 attracts the armature 159 which resists against the tensioning power of the tension spring 157 and inserts the variable power lens 152 into the finder optical path to the position R indicated by the phantom lines in FIG. 11. The variable power lens 152 then magnifys the finder viewing field AV.

The stereo viewing field varying mechanism 150 made in accordance with the present invention can make the finder observation easier in stereo photography, by enlarging the finder viewing field AV, formed relatively small compared with the finder viewing field V as shown in FIG. 12, with the variable power lens 152.

Figure 13:
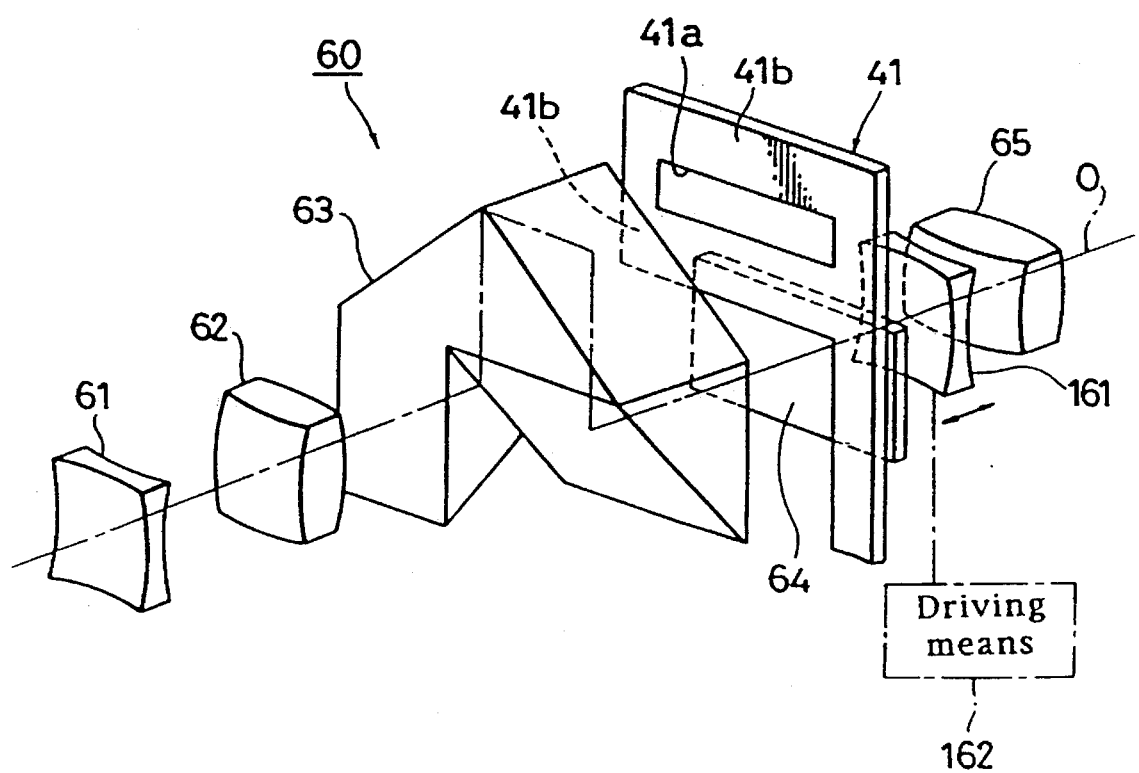
FIG. 13 is a perspective view of an alternate stereo viewing magnification altering mechanism.
Figure 14:
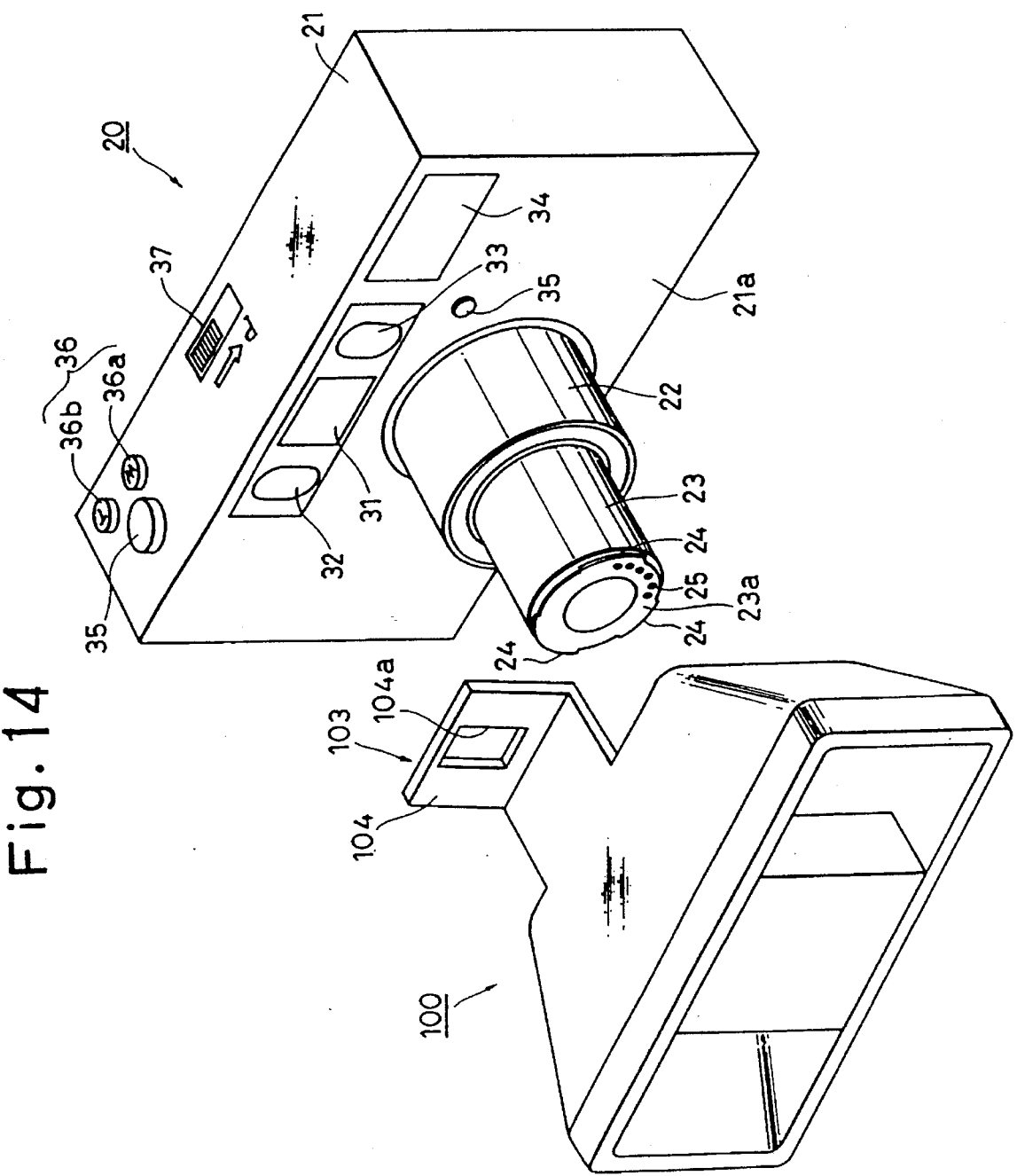
FIG. 14 is a perspective view of the stereo adapter which is formed integral with a viewfinder determining means and the camera which accepts said stereo adapter.

In another embodiment of the present invention, there in provided a longitudinally movable variable power lens 161 between the finder viewing field frame 64 and the eyepiece lens 65 as a part of the viewfinder eyepiece optical arrangement as shown in FIG. 13. When the stereo adapter detector 134 detects the mounted adapter 100, a driving mechanism 162, indicated by the dotted line box, drives the movable variable power lens 161 to a predetermined positions along the viewfinder optical axis O in order to magnify the finder viewing field AV.

Figure 9:
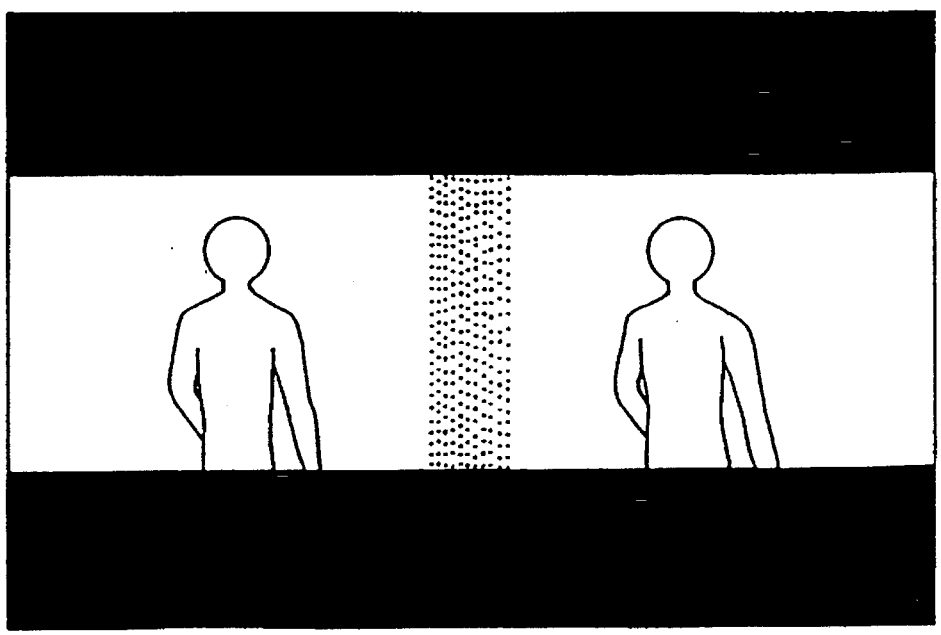
FIG. 9 is a drawing showing how subject images are formed on the left and right portions of the photograph frame in accordance with the present invention.

The vertical to horizontal ratio of the panorama picture size in the stereo photography (one or the other picture size shown in FIG. 9) is close to that of the regular picture size. The regular picture size for instance has a vertical to horizontal ratio of 24:36 or 2:3 while the ratio of the panorama picture size in the stereo photography has a vertical to horizontal ratio of 13:18 or approximately 2:3. In the afore described embodiment, the viewfinder field AV, corresponding to the stereo picture size taken in the panorama picture frame, is formed by the panorama viewfinder frame 41 and the stereo viewing field plate 141 and such a viewfinder field AV is enlarged by the variable power lens 152 or movable variable power lens 161 for observation. Considering the close similarity between the regular size vertical and horizontal ratio and that of the panorama size in stereo photography, the viewfinder can achieve the same effect of the stereo viewing field by simply varying the focal length of the viewfinder objective in the stereo photography without applying the panorama viewfinder frame 41, stereo viewing field plate 141, variable power lens 152 or movable variable power lens 161. In such arrangement formed in accordance with the present invention, the focal length of the viewfinder objective lens required for the viewing field corresponding to a picture taking lens of 35 mm is 70 mm. In other words, when photographing stereo pictures, the focal length of the viewfinder objective lens is set at double the focal length of a regular photograph. Several embodiments in relation to this aspect of the present invention will be discussed below.

Figure 15:
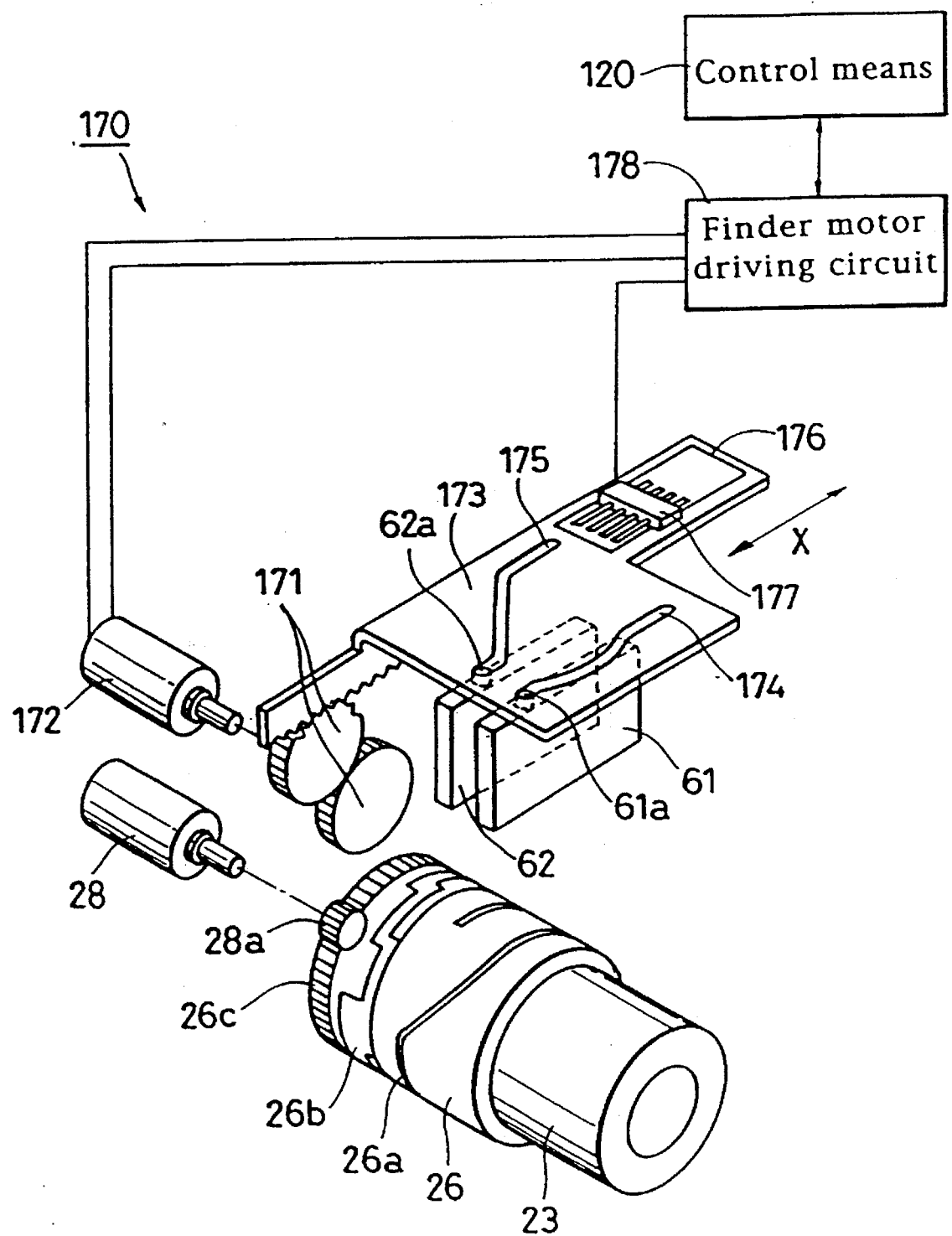
FIG. 15 is a perspective view of the finder variable power elements driving mechanism.

As shown in FIG. 15, the stereo viewfinder effect obtained by the stereo viewing field varying mechanism 150 or the movable variable power lens 161 can be achieved with a viewfinder movable lens driving mechanism 170 which drives the movable lens 61 and 62 of the viewfinder optics 60 independently from the picture taking zoom lens mechanism. In this embodiment, the panorama viewfinder frame 41 is formed as a separate part from the picture size determining plate 43 and said panorama viewfinder frame 41 is inserted into the viewfinder optical path only when the picture size is set on panorama size but the picture taking mode is not in the stereo photographing mode.

The viewfinder movable lens driving mechanism 170 drives the movable lens 61 and 62 back and forth in predetermined spatial relationship to each other through a cam plate 173 which is driven in the direction indicated by an arrow X in FIG. 15 by the viewfinder lens driving motor 172 through the gear train 171. On the movable lens 61 and 62 are formed cam pins 61a and 62a. These pins 61a and 62a are fitted in to the cam grooves 174 and 175 of the cam plate 173, respectively.

A zoom code plate 176 is formed on status of the cam plate 173. The finder motor driving circuit 178 detects the finder magnification by the zoom code brush 177 fixed to a stationary portion of the camera body 21 and electrically contacting the finder motor driving circuit 178 which slides over the zoom code plate 176. The control means 120 connected to the finder motor driving circuit 178 controls the finder motor driving circuit 178 to drive the movable lenses 61 and 62 in coordination with the varying focal length of the zoom lens barrel 23 so as to change the magnification of the finder to a certain magnification corresponding to the current focal length of the photographing lens, in the non-stereo photographing or when the stereo adapter detector 134 does not detect the adapter 100, the control means 120 operates normally controlling the finder motor driving circuit 178 to move the movable lenses 61 and 62 to make the finder viewing field correspond to the picture size formed by the picture taking objective lens, while the stereo adapter 100 is detected by the stereo adapter detector 134, it controls the finder motor driving circuit 178 to move the movable lenses 61 and 62 and make the normal finder magnification multiplied by the predetermined factor (in this case ×2). This arrangement herein achieves the same effect as the previously described mechanism in which a stereo finder viewing field varying mechanism 150 or movable variable power lens 161 are applied.

Figure 16:
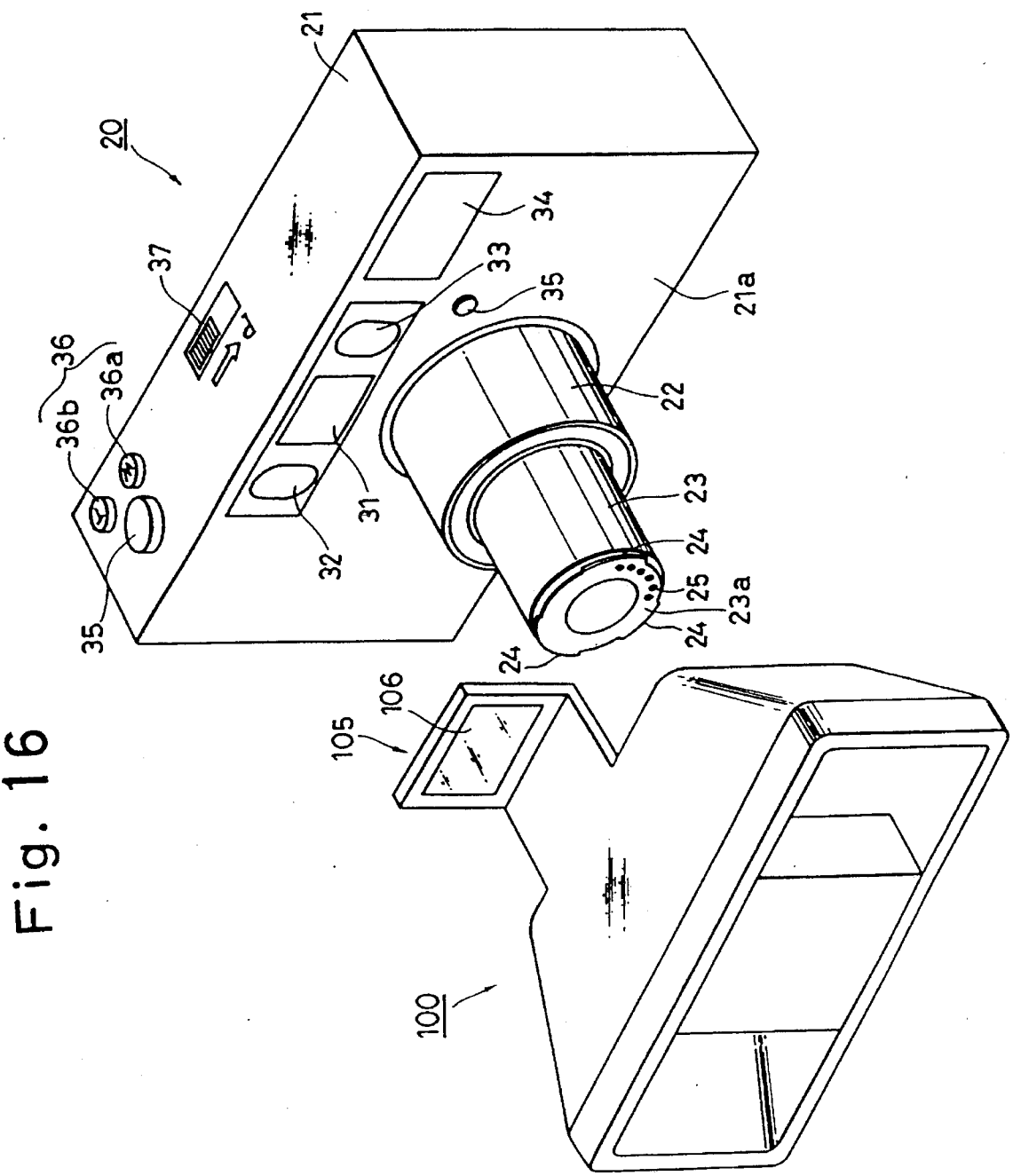
FIG. 16 is a perspective view of the stereo adapter incorporated with the finder magnification varying lens and the camera which adapts said stereo adapter.

In another embodiment of the present invention, there is provided with a finder viewing field magnifier 105 integrally formed on the adapter 100, extending backwards toward the camera 20, from the top back end of the adapter 100 as shown in FIG. 16. In this embodiment, the panorama viewfinder frame 41 is separately installed from the picture size determining plate 43 and is inserted into the finder optical path only when the photographing picture size is the panorama size and at the same time the photographing mode is set to the stereo photography position. The finder viewing field magnifier 105 is positioned centrally as the magnifying lens 106 comes the front of the finder objective window 31 of the camera 20, and magnifies the finder image approximately by a factor of two. The finder viewing field magnifier 105 is so formed that it does not hit the finder objective window when the zoom lens barrel 23 is retracted to the shortest position. As described above, this arrangement can achieve the same effect as the aforementioned embodiments in which a stereo viewing field variation mechanism 150 or movable variable power lens 161 is applied.

Still another embodiment of the finder viewing field adjustment is formed in accordance with the similar arrangement of the stereo viewing field variation mechanism 150 as shown in FIG. 11, in which the variable power lens 152 is replaced by a variable power lens which magnifies the focal length by the finder objective lenses 61 and by a factor of two (2) and the variable power lens is inserted into the finder optical path in front or behind or in between the movable lenses 61 and 62 in the stereo photographing mode. In this embodiment, as in the case of above mentioned embodiments, the panorama viewing field frame 41 is formed separately from the picture size determining plate 43 and inserted into the finder optical path only when the picture size is the panorama size and photographing mode is not set in the stereo photography mode.

In the arrangement formed in accordance with the present invention in which the picture size is switched to the panorama size in the stereo photography mode, the photographing angle in the stereo photography mode is narrower than the regular picture size mode. The electronic flash light can be more effectively applied in the stereo photography if the illuminating angle is narrowed to match the photographing angle of the stereo picture size. By this adjustment, the flash guide number in the stereo photography becomes larger than the nominal guide number. The embodiment related to this arrangement will be discussed below.

Figure 17:
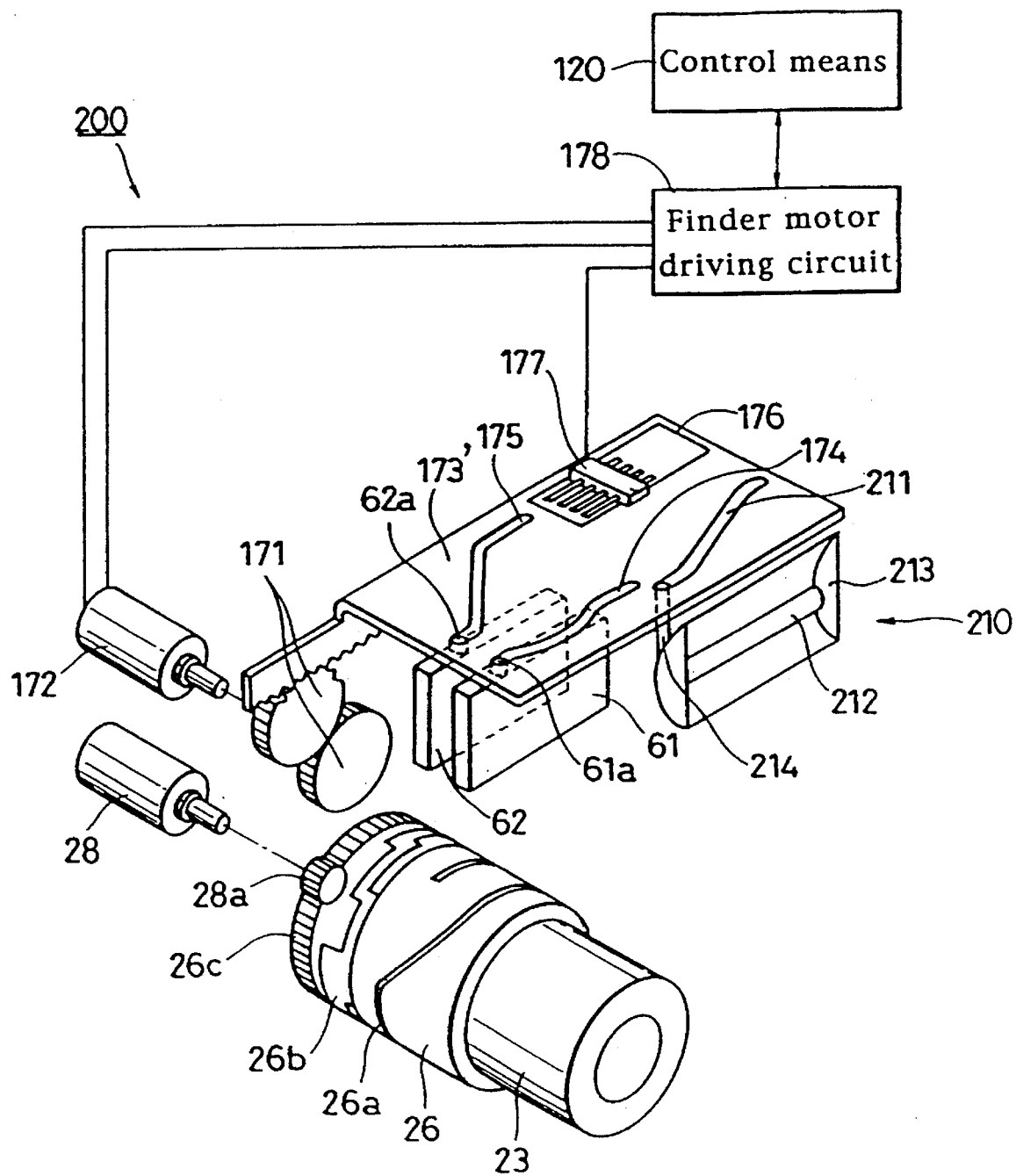
FIG. 17 is a perspective view of a mechanism which drives the electronic flash capable of varying illumination angle.

An embodiment shown in FIG. 17 illustrates the arrangement in which the illumination angle of the electronic flash is narrowed to match the angle with the stereo picture photographing angle by the driving mechanism 200 equipped with an electronic flesh unit 210. In FIG. 17, common parts with aforementioned viewfinder movable lens driving mechanism 170 are designated by the same numbers. The cam plate 173' of this embodiment includes an electronic flash cam groove 21 added to aforementioned cam plate 173 and can drive a flash reflector 213 having an electronic flash tube 212 in the longitudinal direction in respect to the optical axis of the objective lens of the camera by the cam pin 214 fixed on the reflector 213 and said cam groove 211. The reflector 213 is positioned next to the flash window 34 inside the camera body 21. Between the flash window 34 and the reflector 213, there is a convex Fresnel lens, fixed to a stationary portion (not shown) of the camera body 21, which converges the light rays emitted by the flash tube 211. In the non-stereo photographing mode, in this embodiment or when the stereo adapter detector 134 does not detect the adapter 100, the control means 120 operates normally controlling the finder motor driving circuit 178 to move the movable lenses 61, 62 and the reflector 213 to make the finder viewing field and the illuminating angle of the electronic flash unit 210 to correspond to the picture size formed by the picture taking objective lens, while the stereo adapter 100 is detected by the stereo adapter detector 134, it controls the finder motor driving circuit 178, in the stereo photography control mode, to move the movable lenses 61 and 62 to make the normal finder magnification multiplied by the predetermined factor (approximately two (2)). By this adjustment, the flash illuminating angle in the stereo photography becomes narrower than the regular control by half and therefore, flash light of the electronic flash unit 210 can be more effectively utilized and the guide number in the stereo photography becomes larger than the nominal guide number.

Figure 18:
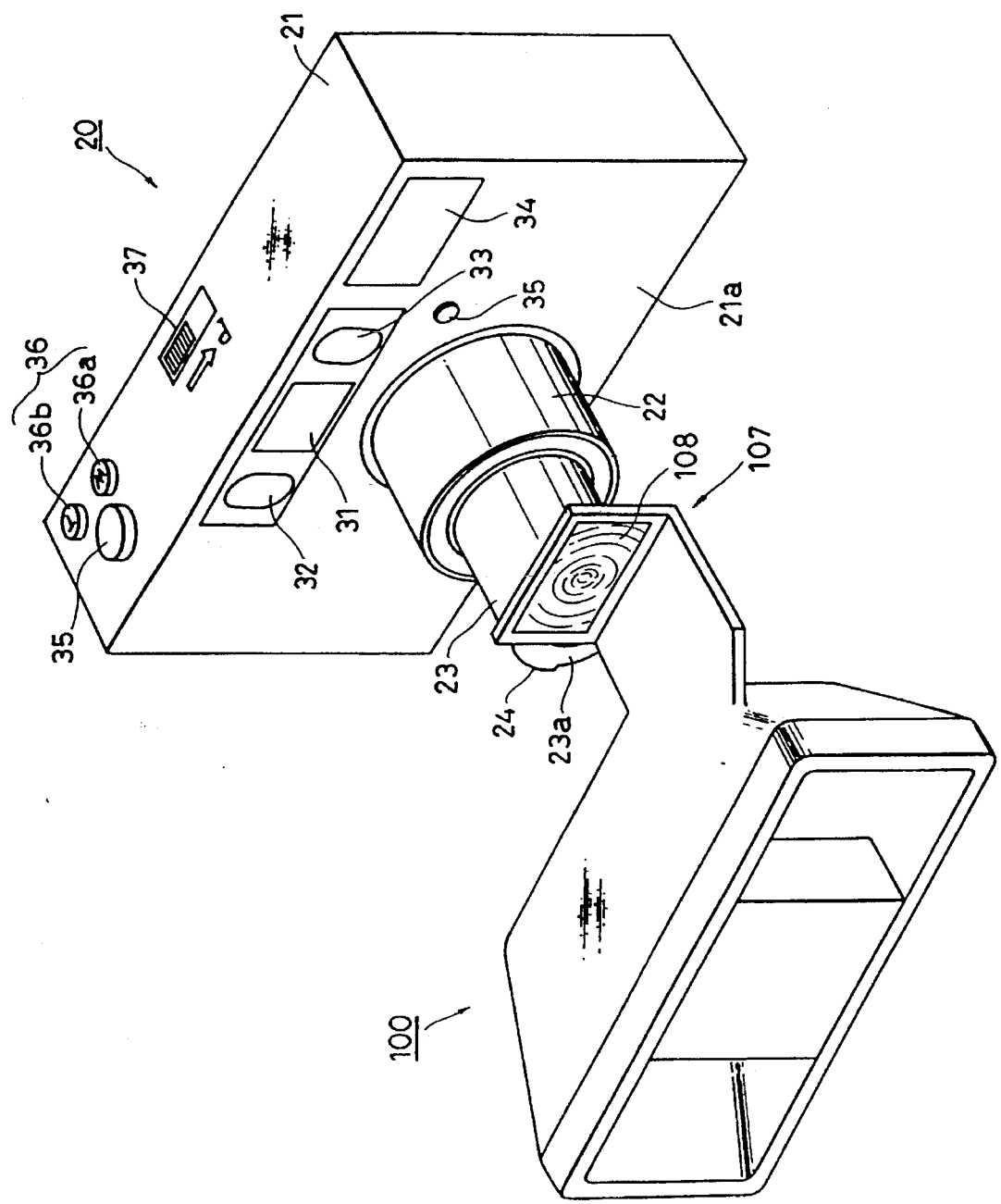
FIG. 18 is a perspective view of the stereo adapter incorporated with the illumination angle varying means and the camera which accepts said stereo adapter.

As shown in FIG. 18, an illuminating angle adjustment member 107 having a Fresnel lens 105 may be integrally formed on the adapter 100 to narrow the flash illuminating angle. Preferably, the power of the Fresnel lens 108 is strong enough to halve the illumination angle of the electronic flash being placed in front, object side, of the flash window 34 when the adapter 100 is mounted on the camera 20. This arrangement can also utilize the flash light of the electronic flash unit 210 more effectively and the guide number in the stereo photography becomes larger than the nominal guide number.

Figure 19:
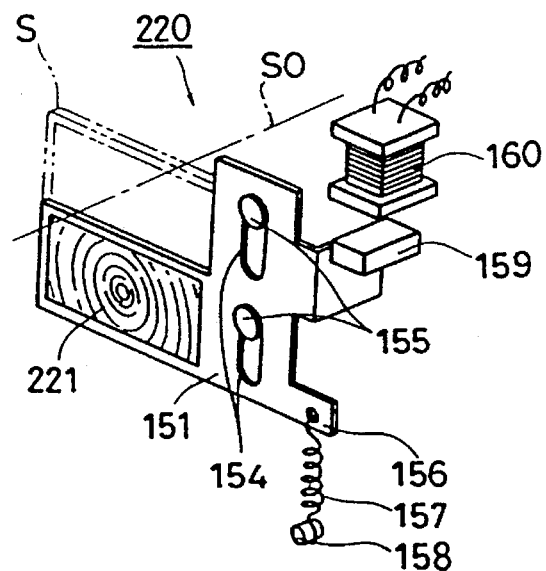
FIG. 19 is a perspective view of an embodiment of the illumination angle varying means.
Figure 20:
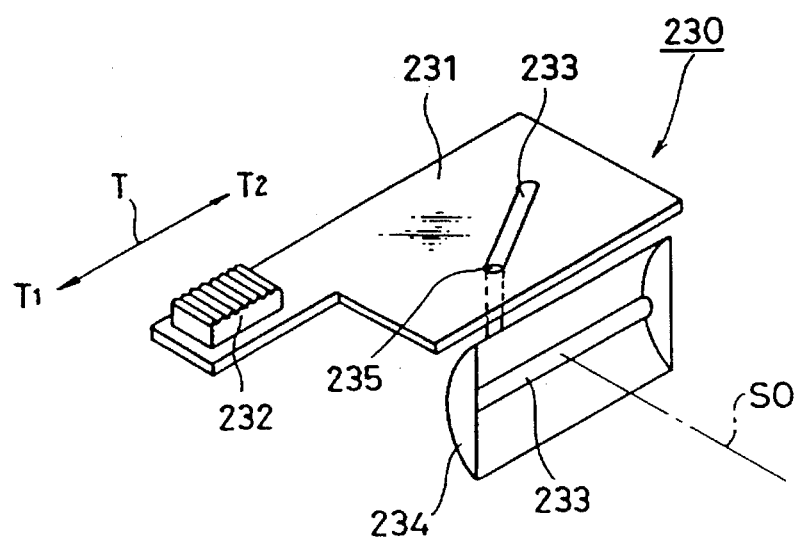
FIG. 20 is a perspective view of another embodiment of the illumination angle varying means.

FIG. 19 illustrates yet another embodiment of the illumination angle adjustment means in which an illumination angle adjustment mechanism 220 is applied to change the illumination angle of the electronic flash corresponding to the photographing angle of the objective lens in the stereo photography. The illumination angle adjustment mechanism 220 includes a mechanism similar to that of the afore described stereo viewing field varying mechanism 150, in which the variable power lens 152 of the stereo viewing field varying mechanism 150 is replaced with a Fresnel lens 221 to narrow the illumination angle by half in this case. In FIG. 19, similar parts of afore mentioned stereo viewing field varying mechanism 150 are designated by the same numbers. When the stereo adapter detector 134 detects the adapter 100, the Fresnel lens 221 is inserted between the flash window 34 and a reflector (not shown) which is installed inside the camera body 21, as indicated by phantom lines S, If the stereo adapter detector 134 does not detect the adapter 100, the Fresnel lens 221 is retracted from the position between the flash window 34 and the reflector. "SO" in FIG. 19 designates the electronic flash optical axis extended extensively parallel with the axis of the photographing optical system, This arrangement can also utilize the flash light Of the electronic flash unit 210 more effectively and the guide number in the stereo photography becomes larger than the nominal guide number, The Fresnel lenses 108 and 221 of above mentioned embodiments may be replaced with a convex lens, FIG. 20 illustrates still another embodiment of the illumination angle adjustment means in which an illumination angle adjustment mechanism 230 is applied to change the illumination angle of the electronic flash corresponding to the photographing angle of the objective lens in the stereo photography. The illumination angle adjustment means 230 includes a laterally movable cam plate 231, with respect to the flash optical axis SO or the arrow designated by T in FIG. 20. The cam plate 231 can be slid by the camera operator towards the arrow T indicated directions by the slide knob 232 as integrally formed with the cam plate 231 and projected from the camera body 21. The cam plate 231 includes a cam groove 233 formed in a predetermined shape and fitted with a cam pin 235 formed on a reflector 234 having a flash tube 233 and movable along the direction of the flash optical axis SO. A convex Fresnel lens, not shown, fixed to a stationary portion (not shown) of the camera body 21, is located between the flash window 34 end the reflector 234. In this arrangement, the slide knob 232 is positioned at the T2 position shown in FIG. 20 in normal picture photographing mode and not in the stereo mode to match the illumination angle of the electronic flash unit to the regular picture photographing angle. In the stereo photographing mode in which the picture frame size is switched to the panorama size, the slide knob 232 is positioned at the T1 position shown in FIG. 20 and the reflector 234 is moved backward, guided by the cam groove 233 and thus the illumination angle is changed corresponding to the stereo picture size.

The illumination angle of the stereo photography mode is preferably a half of the illumination angle in the normal mode. To satisfy the conditions described herein, the cam groove 233 is formed to halve the illumination angle at the T1 position, of the electronic flash unit in normal mode. In addition to above described arrangement, if the slide knob 232 movement is associated with the stereo photograph mode switching operation, the illumination angle of the electronic flash unit is always set at one half of the normal photographing mode. The flash light of the electronic flesh unit 210 can be utilized more effectively and the guide number in the stereo photography becomes practically larger than the nominal guide number.

Figure 21:
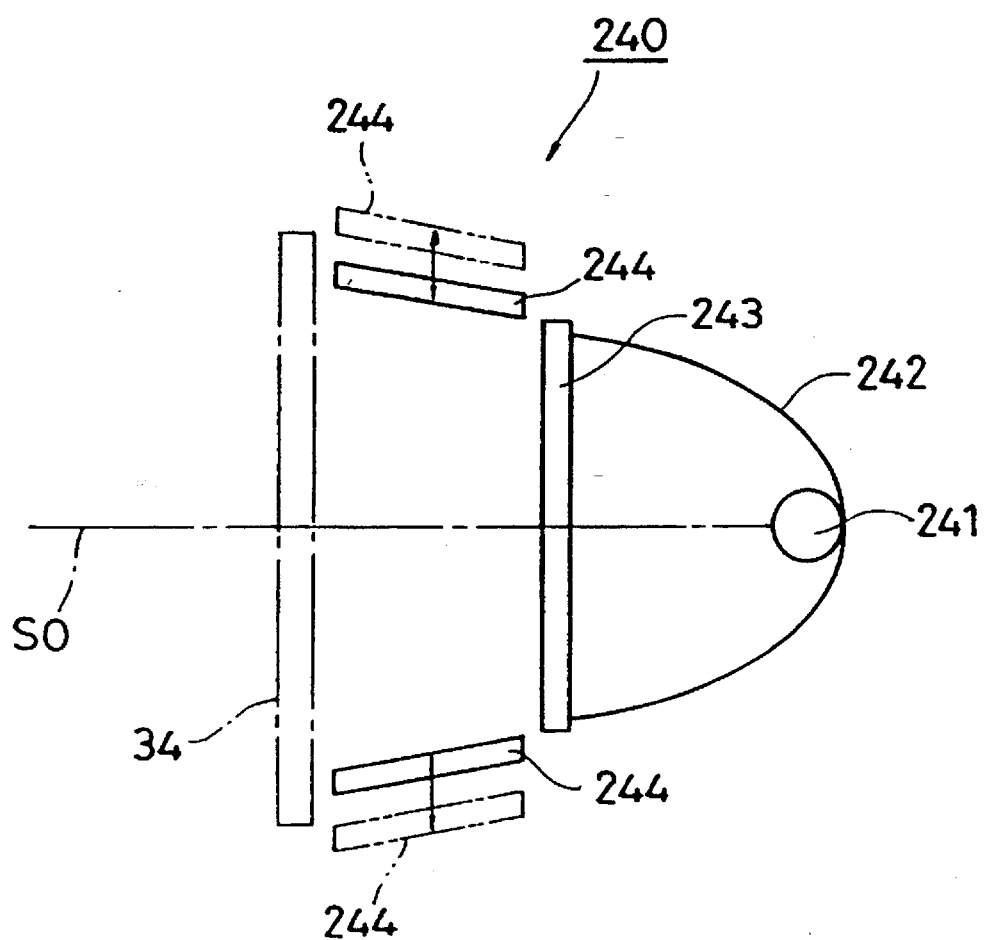
FIG. 21 is a side elevational view of yet another embodiment of the illumination angle varying means.

FIG. 21 illustrates still another embodiment of the illumination angle adjustment means in which an illumination angle adjustment mechanism 240 is applied to narrow the illumination angle of the electronic flash. A reflector 242 including a flash tube 241 and positioned next to the flash window 34 includes a Fresnel lens 243 at the front end thereof. Upper and lower portion of the space between the Fresnel lens 243 and the flash window 34 mounted on the front wall 21a of the camera body 21, there are a pair of reflector plates 244 perpendicularly held with respect to the flash optical axis SO and vertically movable. When the stereo adapter detector 134 does not detect the adapter 100, the pair of reflector plates 244 are held at the retracted position indicated by phantom lines from the optical axis of the flash SO or the position where the illumination angle of the flash corresponds to the normal picture size. If the stereo adapter detector 134 detects the adapter 100, the pair of reflector plates 244 are positioned at closer position to the optical axis of the flash SO indicated by solid lines to narrow the illumination angle of the flash corresponding to the stereo picture size.

Figure 22:
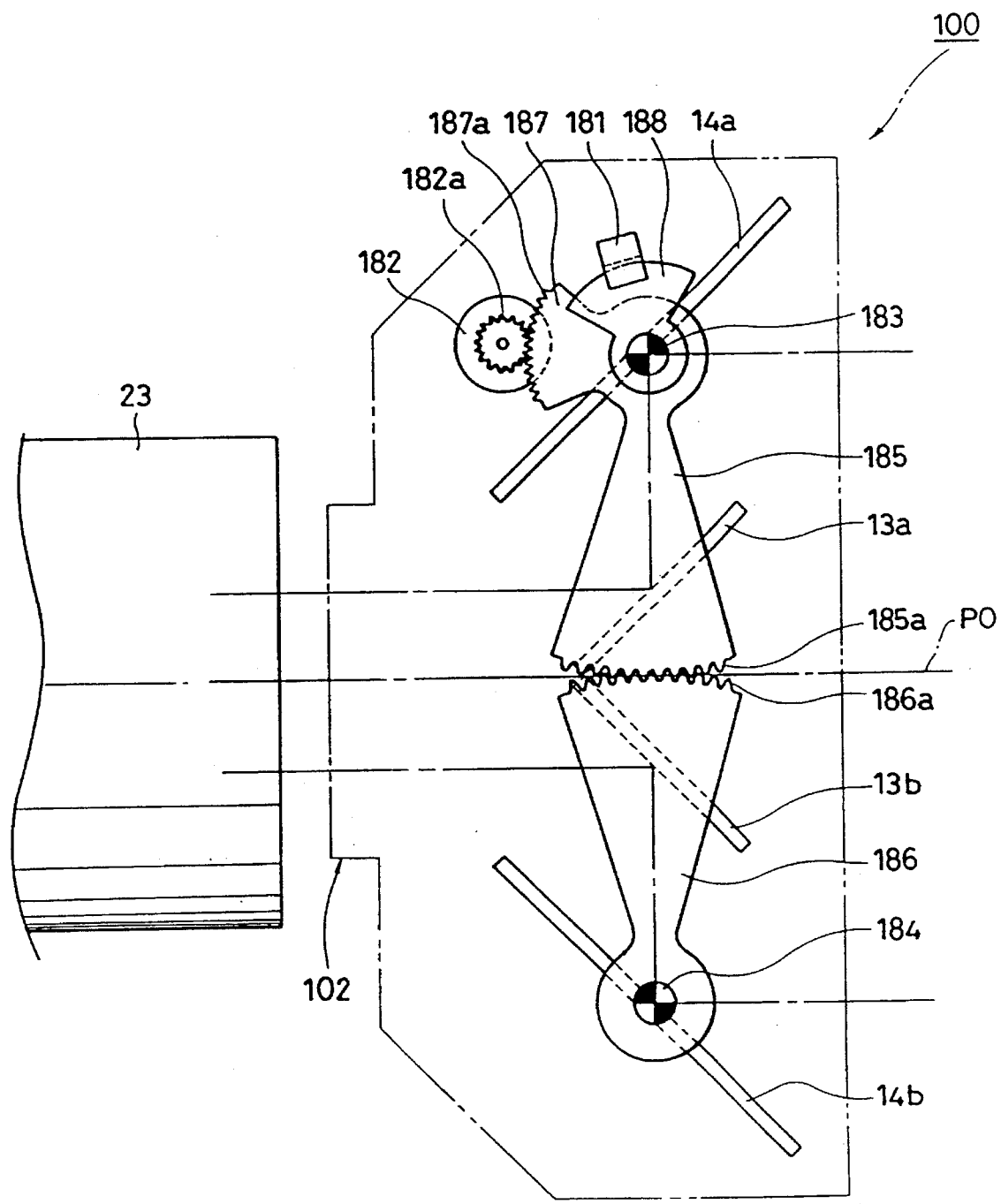
FIG. 22 is a top view of the inside mechanism of the stereo adapter.

FIG. 22 shows the internal structure of the adapter 100. The adapter 100 includes a pair of primary mirrors 14a and 14b, which can rotate on a pair of pivoting axles 183 and 184 whose pivoting points coincide with the reflecting surface of the primary mirror 14a and 14b. The primary mirrors 14a and 14b are provided with sector gears 185 and 186 extending perpendicularly in relation to the pivoting axles 183 and 184, respectively. The axis 183 is set perpendicular to a plane formed by an optical axis incident on the surface of the mirror 14a and an optical axis of the reflected light from the surface of the mirror 14a. The same is also applied to the axis 184 and the optical axes incdent on and reflected at the mirror 14b. Gear portions 185e and 186e are formed on the edges of the sector gear 185 and 186, respectively, which are engaged with each other. Primary mirrors 14a and 14b rotate symmetrically about the photographing optical axis PO.

A small sector gear 187 is integrally formed on the sector gear 185. The sector gear 187 extends away from the primary mirror 14a. Gear portion 187a is formed on an arc edge of the small sector gear 187 to engage with a drive pinion 182a of a mirror driving motor 182 fixed on stationary portion (not shown) of the adapter 100.

The sector gear 185 includes a sector plate 188 which integrally rotates with the sector gear 185, next to the small sector gear 187. The sector plate 188 is a part of known photo-interrupters which include an encoder 181. The degree of rotation of primary mirrors 14a and 14b or the incident light angle to the secondary mirrors 13a and from the 14a and 14b, respectively, can be detected by the sector plate 188 and the encoder 181. The mirror driving motor 182 and the encoder 181 are connected to the mirror motor driving circuit 180 shown in FIG. 2, which is controlled by the control means 120.

Figure 23:
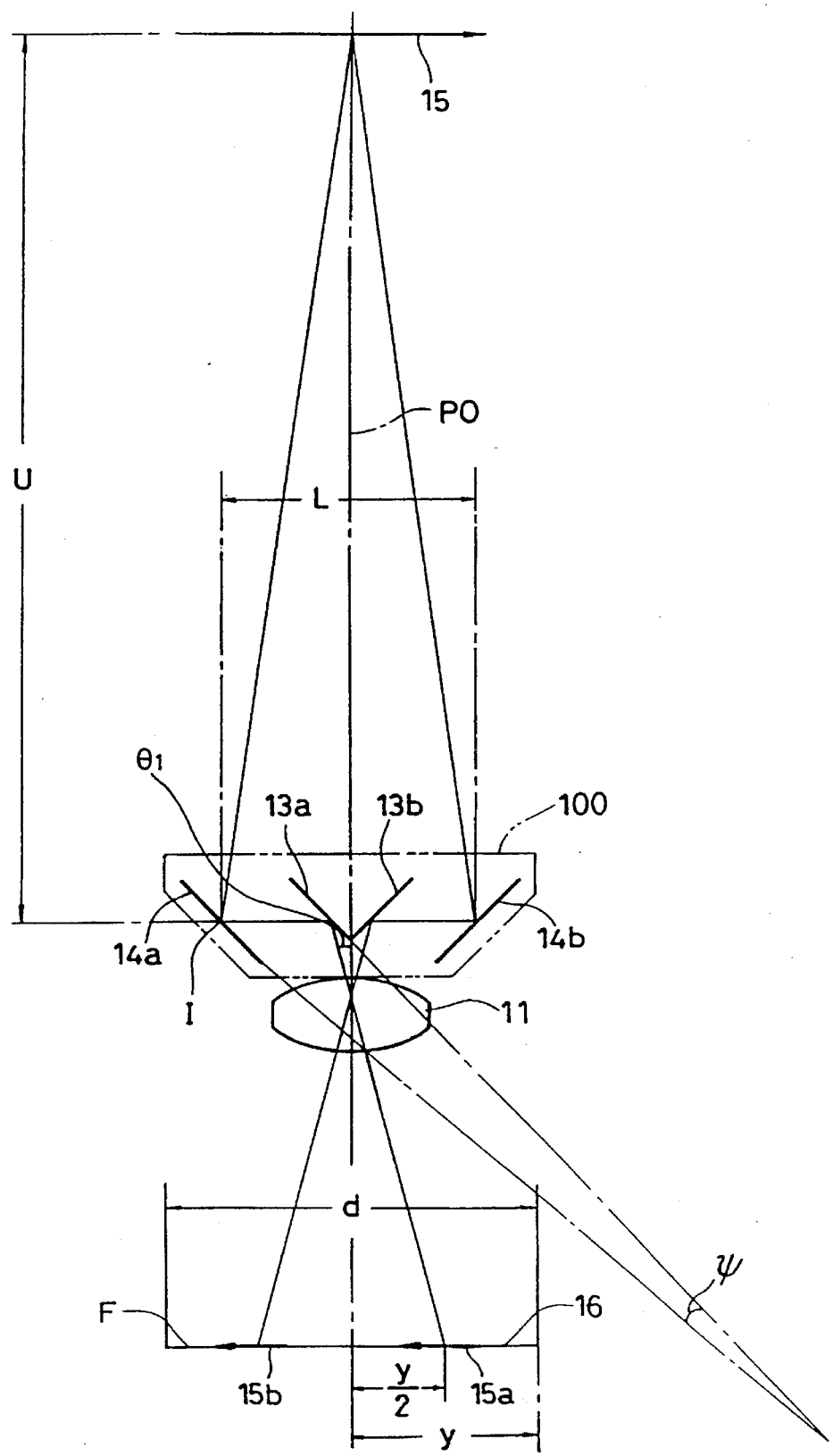
FIG. 23 is a schematic view of the relative positions of the primary and secondary mirrors rotated according to the subject distance and the objective lens focal length.
Figure 24:
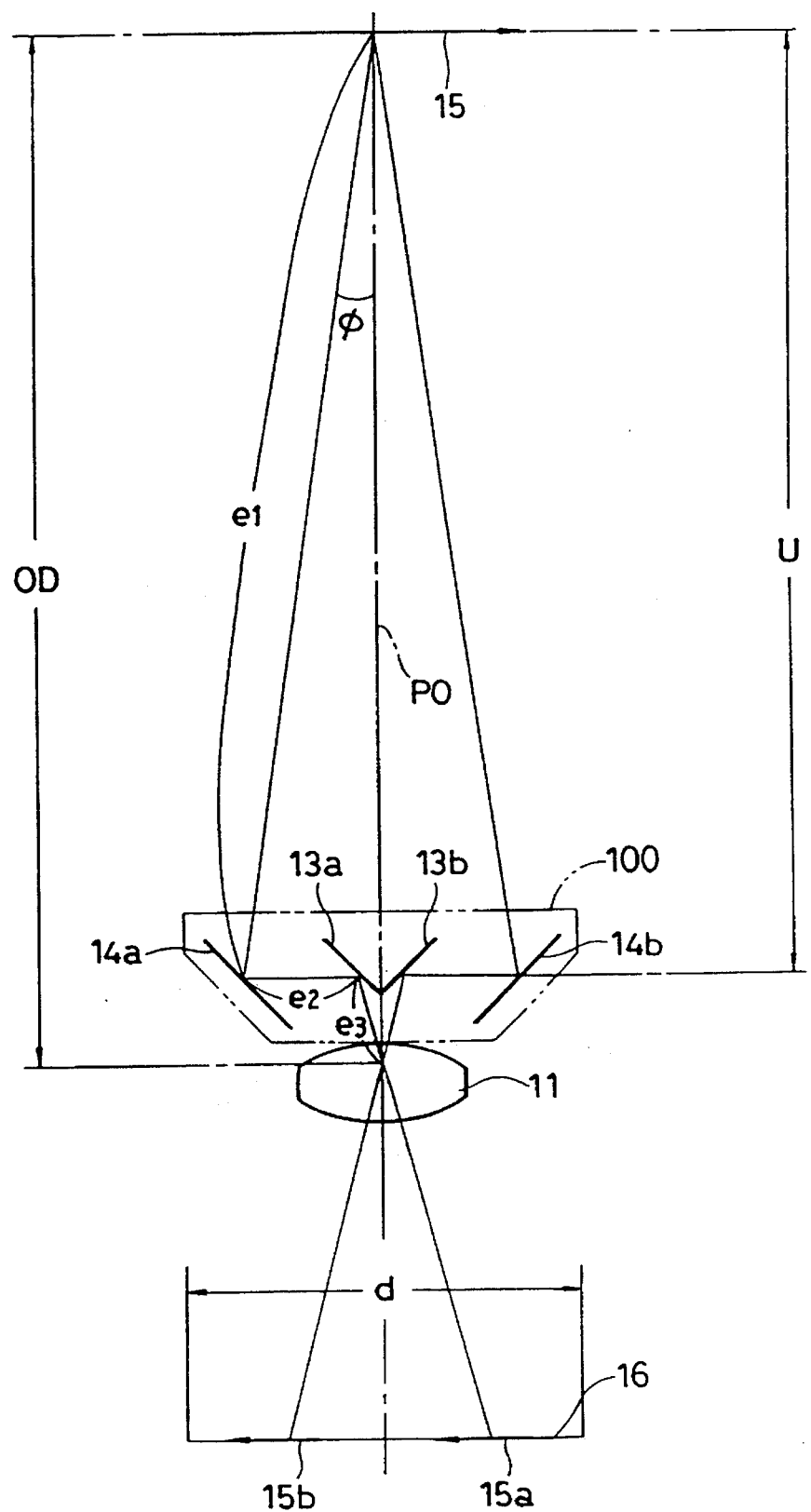
FIG. 24 is a schematic view of the stereo adapter to show the increase in the optical path caused by the adapter.

The primary control means 120 controls the rotation of the prime mirrors 14a and 14b in accordance with the subject distance and the focal length of the photographing lens. The control means 120 controls the rotations of prime mirror 14a and 14b with regard to the focal length f of the photographing lens, provided the subject distance is at infinity, to satisfy the following formula, where, as shown in FIG. 23, the incident light angle directed by prime mirror 14a or 14b and secondary mirror 13a or 13b, respectively, with respect to the optical axis PO is $\theta_1$, the distance on the image forming plane or the film surface from the optical axis PO of the photographing lens 11 one edge of the picture in the horizontal direction is y, the differential angle between a primary mirror 14a or 14b and a secondary mirror 13a or 13b, respectively, is $\Psi$.

$$\Psi = \theta_1/2 = (\frac{1}{2})\tan^{-1}(y/2f) \quad (1)$$

The secondary control means 120 controls the rotation of the prime mirrors 14a and 14b with regard to the subject distance, provided the distance between the subject 15 and the light incident point I on the primary mirror 14a or 14b is finite, to satisfy the following formula, where the base line is L, the incident angle, with respect to the optical axis provided the subject is at finite distance U, is $\theta_2$.

$$\theta_2/2 = (\frac{1}{2})\tan^{-1}(L/2U) \quad (2)$$

If the subject distance U is finite, the control means 120 conducts said primary and secondary controls simultaneously. Or in other words it controls the rotations of prime mirrors 14a and 14b to satisfy the following formula.

$$\Psi = (\frac{1}{2})[\tan^{-1}(L/2U) + \tan^{-1}(y/2f)]$$

In case the distance U is infinite, the control means 120 conducts the control only to satisfy above mentioned formula (1).

Stereo photographs can be taken only at a certain focal length of the photographing lens with conventional stereo adapters having fixed mirrors, because, at other focal lengths, a pair of the subject images formed in one frame of the film shift from the center of said frame. With the adapter 100 made in accordance with the present invention, the subject images do not shift from the center of the picture frame by various focal lengths of the photographing lens because such image shifts are cancelled by the proper rotations of the primary mirrors 14a and 14b and thus the adapter enables stereo photography at various focal lengths to be successful.

A further drawback presented by conventional stereo adapters with fixed mirrors is that the incident light angle from the subject with respect to the primary mirrors changes according to the variable subject distance. The incident light angle change causes the image to shift within the picture frame and makes stereo vision of the resultant photographs through a known stereo viewer difficult or less effective. The incident light angles in respect to the primary mirrors do not change with the adapter 100 formed in accordance with the present invention and does not cause the subject images formed on the film to shift according to the subject distance change.

The optical path from the photographing lens to the subject becomes longer with the adapter 100 mounted on the camera 20 than the optical path length without the adapter 100. To compensate for such a difference, the control means 120 controls an AF circuit (not shown) built in the camera 20 to carry out a focusing operation based on the compensated subject distance MD, or the distance OD calculated by the distance measuring device 122, shown in FIG. 2 added by the extended optical path length E when the stereo adapter detector 134 detects the adapter 100. The extended optical path E is as follows;

$$E = e1 + e2 + e3 - OD$$

and from this MD is defined as;

$$MD = OD + E.$$

Here, e1 is a variable, $e1 = U/\cos\phi$.

With a conventional lens-shutter type camera having an automatic focusing means including a separate AF optics from the photographing lens, for instance, an active auto-focus device including a light emitter and a light receiver on the front face of the camera, focusing becomes erroneous as in proportion to the extended optical path length caused by the mounted adapter 100. A camera with the arrangement described above does not make erroneous focusing with the adapter mounted on the camera 20 to take stereo photographs.

In another embodiment of the present invention, there is provided with a prism (not shown) as a light path extender which can be applied in front of the infrared light receiving window 33 or in front of the light sensor, not shown, placed inside the camera body 21 in the back of said infrared light receptor 33 when the adapter 100 is mounted on the camera 20. A practical method to apply such a prism or an optical path extender for instance, is to provide a prism attaching and detaching mechanical structure having grooves on the front wall of the camera 21a and fitting pins on the prism and the camera user manually attaches or detaches the prism with the adapter 100 as required.

Still another embodiment of the present invention, has a prism attached to the adapter 100 so that the light exiting plane of the prism is placed in front of the infrared receiving window when the adapter 100 is mounted on the camera 20.

Yet another embodiment has an electromagnet as the stereo viewfinder field switching mechanism 140 or in the stereo viewing field varying mechanism 150 to insert and retract said prism to and from the space in front of the infrared light sensor (not shown) as the adapter 100 is detected by the stereo adapter detector. The prism can be replaced with a lens.

In order to obtain a proper 3D effect of the stereo photography the subject distance is determined by the base line length L or the distance between the center of the primary mirror 14a and the center of the another primary mirror 14b as shown in FIG. 23. The preferred subject distance for the purpose is approximately 20 to 60 times of the base line L. The control means 120 therefore, fixes the focusing distance of the AF-AE unit 121 built in the camera 20, as shown in FIG. 2, at a certain distance OD, as the stereo adapter detector 134 detects the adapter 100. Said distance OD, is determined by the base line length L and is somewhere between 20 to 60 times of said L. In the case where the base line L spans 7 cm, the control means 120 fixes the focusing distance of the AF-AE unit 121 at a predetermined distance $OD_P$, a distance in between, for instance, 140 cm and 420 cm. As discussed above, the suitable subject distance for the stereo photography is limited in a certain range, and therefore, a fixed focus system does not present any problem in practice.

With conventional stereo photographic equipment, despite the limited subject distance for 3D effect, the auto-focus mechanism, if installed, tries to measure the entire distance range. The focusing arrangement formed in accordance with the present invention, such a problem is solved by the distance measuring device 122 and focusing operation by the AF-AE unit 121 when the adapter 100 is mounted.

The control means 120 also controls the AF-AE unit 121 to stop down the lens aperture to a predetermined opening $F_P$ corresponding to a large F number, for instance f/6.7 when the stereo adapter detector 134 detects the adapter 100. Such a control is preferred because, in stereo photography, the entire subject area from a close distance to far distance should be in sharp focus to obtain the best 3D effect. If the AE mechanism of the camera tries to control the lens opening at a wide open aperture, the depth of field becomes shallow and the resulting photographs do not display a good 3D effect. By the aperture control arrangement formed in accordance with the present invention, the wide depth-of-field range is secured and sharp focus spans from close subjects to far subjects produces good 3D effect photographs in stereo photography. This arrangement can be applied not only for lens-shutter type cameras but also for single-lens-reflex cameras.

Figure 25:
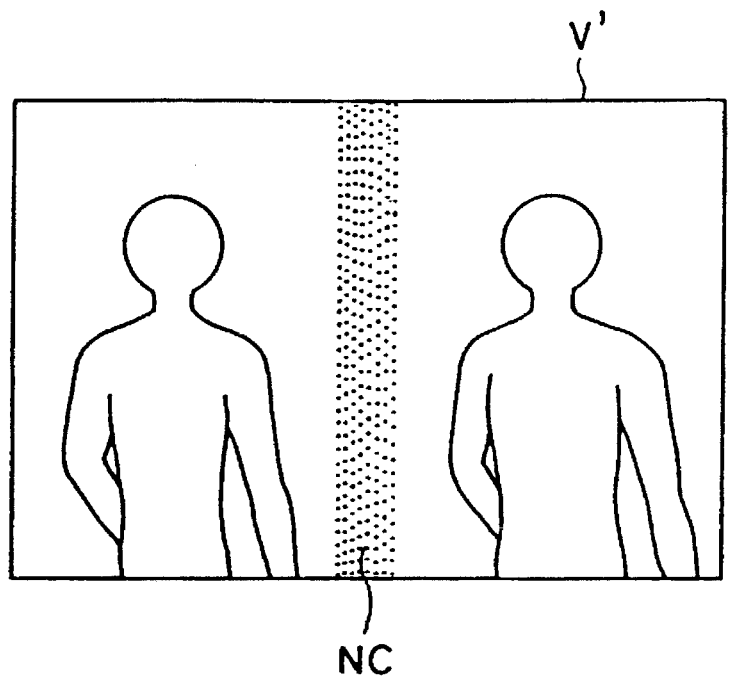
FIG. 25 is a drawing to show the finder viewing field in the conventional single-lens reflex stereo photography.
Figure 26:
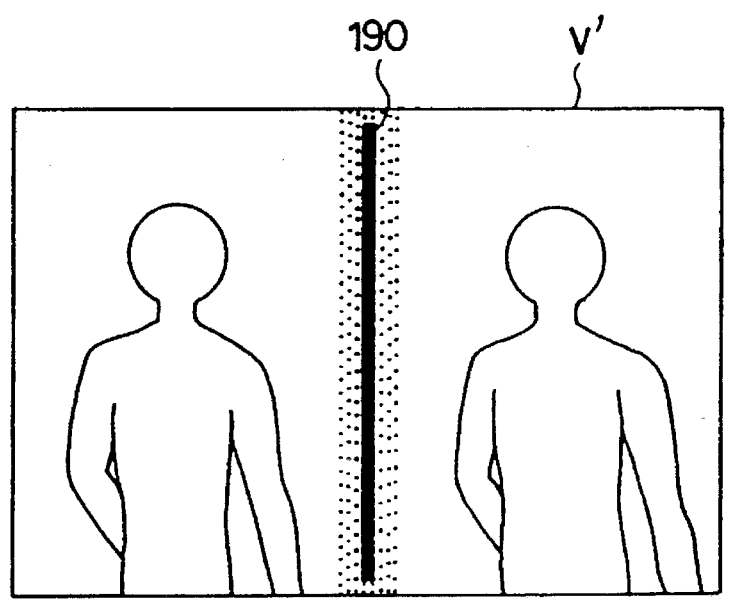
FIG. 26 is a drawing to show the finder viewing field in the single-lens reflex photographing in accordance with the present invention: and, FIG. 27 is a schematic view of the stereo picture-taking principle with a conventional stereo picture photographing system.
Figure 27:
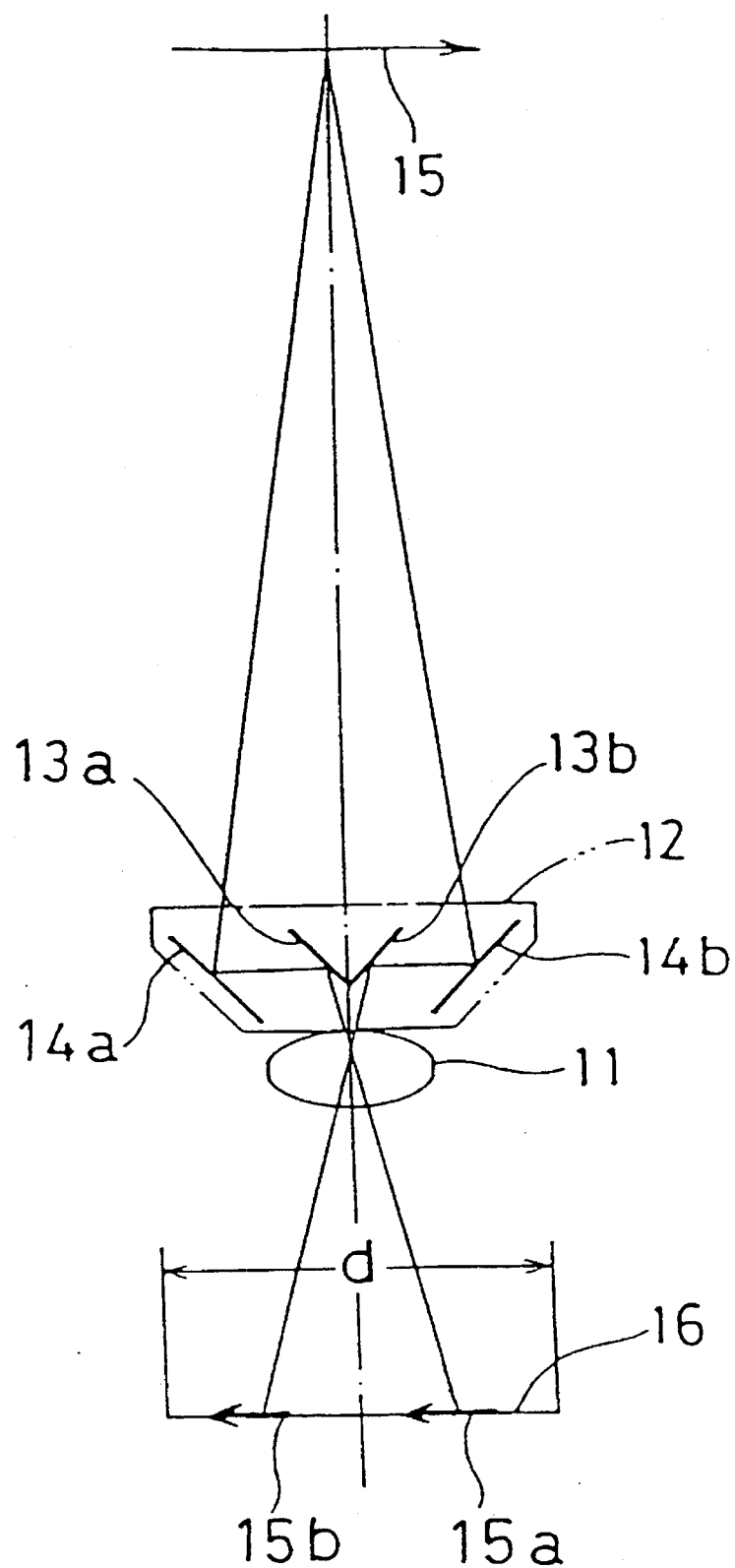

The same adapter 100 for the lens-shutter type camera 20 noted in above mentioned embodiments is applied to a single-lens reflex (not shown), the border line between the left and right images in the viewfinder field V' appears to be unclear as shown by area NC in FIG. 25. With the single-lens reflex formed in accordance with the present invention, linked with the mounting of the adapter 100 on the single-lens reflex, a finder frame 190 can be inserted at the border between the left and right images in the viewfinder field V'. In this arrangement, the mounting of the adapter on the single-lens reflex can be detected by a similar method to that described above with the camera 20. The actual structure of the finder frame 190 may be for instance, a liquid crystal display plate placed over the finder screen (not shown). In this case when the adapter 100 is detected, the liquid crystal display is polarized to be opaque. If the adapter 100 is not detected, the liquid crystal display is not polarized and stays transparent.

Another embodiment of the finder frame 190 can be a bar inserted to and retracted from the focusing screen (not shown), mechanically in linked operation with the attaching and detaching of the adapter 100. With this arrangement, the border line between the left and right images on the finder viewing field of the single-lens reflex can be observed very clearly as the adapter is attached.

With conventional stereo photographs, the border between the left and right images photographed in one frame of the film is very vague. Normally the picture edges are cropped in printing process. If the finished print is off center horizontally or in the film advance direction, the border between the two images lies off center then consequently the best 3D effect can not be obtained. If the border line is clearly recognized, the printed pictures can be aligned properly referring to the border line for the proper stereo picture observation with a known stereo viewer. To make the vague border line between the two images in conventional stereo pictures clearer, a line of light emitting devices may be placed on the pressure plate at corresponding position to the border line, perpendicular to the film advance direction and excite said light emitting devices after each exposure. This way the border line between the two images becomes very clear.

Another method to achieve the above mentioned purpose is for a transparent plate having a liquid crystal display line at the corresponding position to the border line, perpendicular to the film advance direction, to be placed directly in front of the film. In stereo photography, the liquid crystal display is polarized to be opaque and clearly mark the border line between the two images formed in one frame of the film. The liquid crystal display is not polarized and stays transparent in modes other than the stereo photography mode.

In this embodiment, although the horizontally long picture size switched to by the picture frame size altering mechanism 40 is the panorama size, other picture size such as so-called Hi-Vision size format can be applied.

In one aspect of the present invention the stereo photographing system provides opportunities to enjoy stereo pictures for photographic beginners who do not have trained picture-taking techniques or knowledge because the system automatically meets the variable conditions required to take stereo photographs without bothering photographers when in the stereo photography mode.

In another aspect of the present invention the stereo photographing system does not have a difference between the finder viewing field and actual photographing area when the adapter is attached even to a lens-shutter type camera by including a finder viewing field framing means formed in the finder optical path to choose from the regular finder viewing field and the stereo viewing field, a detecting means which detects if a stereo adapter is attached on the camera, and a switching means which switches between the regular finder viewing field and the stereo finder viewing field formed by the finder viewing field framing means.

In yet another aspect of the present invention the stereo photographing means does not have a difference between the finder viewing field and actual photographing area when the adapter is attached even to a lens-shutter type camera because the system includes a stereo finder viewing field masking means integrally formed with the stereo adapter that is placed in front of the finder of the camera when the stereo adapter is mounted on the camera.

In yet another aspect of the present invention the stereo photographing system provides realistic stereo photographs by having a mechanism to photograph two images of the same subject in one picture frame including, a stereo adapter detecting means and a picture size switching means which alters the picture size frame to a vertically long picture size when the stereo adapter detecting means detect the stereo adapter mounted on the camera.

In yet another aspect of the present invention the stereo photographing system makes it possible to take stereo pictures with a variable focal length objective lens and to keep the image of the subject at the center of the picture frame and therefore maintains the best 3D effect by rotating primary reflecting means to change the incident light angles upon secondary reflecting means from said primary reflecting means according to the focal length of the objective lens detected by the focal length detecting means.

In yet another aspect of the present invention the stereo photographing system can keep the subject images at the center of the picture frame for the best 3D effect in spite of the variable subject distance by rotating the primary reflecting means to change the incident light angles upon the secondary reflecting means from the primary reflecting means according to the subject distance detected by the subject distance measuring means and to keep the incident light angle positioned upon the primary reflecting means.

In yet another aspect of the present invention the stereo picture photographing system has its adapter attached onto a lens-shutter type camera which does not go out of focus due to the extension of the optical path, by operating a focusing means, according to the subject distance measured by the subject distance measuring means added by the extended optical path distance when the adapter detecting means detects the adapter mounted on the lens-shutter type camera.

In yet another aspect of the present invention the stereo photographing system having its adapter attached onto a lens-shutter type camera, does not go out of focus due to the extension of the optical path, by inserting a optical path refracting means, in front of the light receiving window of the subject distance measuring means when the adapter detecting means detect the adapter mounted on the lens-shutter type camera, In yet another aspect of the present invention the stereo photographing system has its adapter attached on a lens-shutter type camera which does not go out of focus due to the extension of the optical path by including a lens-shutter type camera having a subject distance measuring means, by projecting infrared upon the subject and receiving the reflected light by the light sensing means, and a stereo adapter having an integrally formed light path refracting means which is positioned in front of the light sensor means when the stereo adapter is attached on the lens-shutter type camera.

In yet another aspect of the present invention the stereo photographing system reduces the complexity of the subject distance measuring means and the focusing control means by making the automatic focusing operations unnecessary in the stereo photography mode, by having the focusing means fixed at a predetermined subject distance when the stereo adapter detecting means detects the adapter mounted on the camera.

In a eleventh aspect of the present invention the stereo photographing system provides the most realistic and effective 3D photographs having the depth of field extend from a close distance to infinity by stopping down the lens aperture, controlled by the automatic exposure control means to a F number which is set to at least a predetermined f/number when the stereo adapter detecting means detects the adapter mounted on the camera.

We claim:

1. A stereo photographing system having a stereo adapter for photographing two separate images of a same subject viewed from different points and formed onto one picture frame next to each other, and a camera including a finder and a photographing lens to which said stereo adapter can be detachably attached at the front end of said photographing lens, comprising:

a finder viewing field determining means provided in an optical path of said finder for selectively determining either a regular viewing field or a stereo viewing field; said determining means comprising:

a stereo finder viewing field determining means which can be inserted into and retracted from the finder optical path; and, a means for inserting and retracting said stereo finder viewing field determining means into and from said finder optical path;

a detecting means which detects said stereo adapter when said stereo adapter is mounted to said camera;

a switching means which switches between said regular viewing field and said stereo viewing field determined by said viewing field determining means and responsive to said detecting means, wherein said switching means operates as a driving means for said inserting and retracting means to insert and retract said stereo finder viewing field determining means when said detection means detects that the stereo adapter is mounted to the camera;

a variable power lens which is provided in a manner such that said variable power lens can be inserted into and retracted from said finder optical path at a position closer to an eyepiece than said stereo finder viewing field determining means, wherein a magnification of said finder is increased when said[,] variable power lens is inserted into said finder optical path;

a means for inserting and retracting said variable power lens into and from said finder optical [Path] path; and, a means for actuating said inserting and retracting means to insert and retract said variable power lens into and from said finder optical path when said detection means detects that said stereo adapter is mounted to said camera.

2. A stereo photographing system having a stereo adapter for photographing two separate images of a same subject viewed from different points and formed onto one picture frame next to each other, and a camera including a finder and a photographing lens to which said stereo adapter can be detachably attached at the front end of said photographing lens, comprising:

a finder viewing field determining means provided in an optical path of said finder for selectively determining either a regular viewing field or a stereo viewing field; said determining means comprising:

a stereo finder viewing field determining means which can be inserted into and retracted from the finder optical path; and, a means for inserting and retracting said stereo finder viewing field determining means into and from said finder optical path;

a detecting means which detects said stereo adapter when said stereo adapter is mounted to said camera;

a switching means which switches between said regular viewing field and said stereo viewing field determined by said viewing field determining means and responsive to said detecting means, wherein said switching means operates as a driving means for said inserting and retracting means to insert and retract said stereo finder viewing field determining means when said detection means detects that the stereo adapter is mounted to the camera;

a variable power lens which is provided in said finder optical path at a position closer to an eyepiece than said stereo finder viewing field determining means in a manner such that said variable power lens can move along a finder optical axis, wherein a magnification of said finder is varied when said variable power lens moves along said finder optical axis;

a means for moving said variable power lens along said finder optical axis; and, a means for actuating said moving means to move said variable power lens along said finder optical axis to increase a finder magnification when said detection means detects that said stereo adapter is mounted to said camera.

3. A stereo photographing system, comprising:

a stereo adapter for photographing two separate images of a same subject viewed from different points and formed in one picture frame next to each other;

a camera including a finder and a photographing lens to which said stereo adapter can be detachably attached at the front end of said photographing lens, and a picture size switching means which can selectively switch a picture size between a regular size and a horizontally long picture size whose horizontal to vertical ratio is different from the regular size, a means for detecting that said stereo adapter is mounted on said camera; and, a means for actuating said picture size switching means to alter said picture size to said horizontally long picture size when said detection means detects that said stereo adapter is mounted to said camera.

4. The stereo photographing means of claim 3, wherein said camera further comprises a strobe, and further wherein said stereo adapter further comprises a strobe illuminating angle narrowing means which is formed integral on said stereo adapter and placed in front of a strobe light emitter of said strobe for narrowing an illuminating angle of said strobe when said stereo adapter is mounted to said camera.

5. The stereo photographing system of claim 3 wherein, said camera further comprises a strobe, and an illumination angle varying means for varying an illumination angle of said strobe, wherein said illumination angle varying means narrows an illumination angle of said strobe when said detection means detects that said stereo adapter is mounted to said camera.

6. The stereo photographing system of claim 3, wherein said camera further comprises a strobe, and wherein said stereo adapter further comprises an illumination angle varying member placed in front of a strobe light emitter of said strobe when said stereo adapter is mounted on said camera for making an illumination angle of said strobe one half of an illumination angle of said strobe when said said stereo adapter is not mounted to said camera.

7. The stereo photographing system of claim 3, wherein said camera further comprises a strobe, and an illumination angle varying means for varying an illumination angle of said strobe, when said detection means detects that said stereo adapter is mounted to said camera, one half of an illumination angle of said strobe when said detecting means does not detect that said stereo adapter is mounted onto said camera.

8. The stereo photographing system of claim 3 wherein, said camera is a lens-shutter type camera having a zoom lens and a zoom finder which varies a magnification of said zoom finder in association with a zooming of said zoom lens, wherein said lens-shutter type camera further comprises a control means which controls said zoom finder to set a greater focal length of an objective lens of said zoom finder when said detection means detects that said stereo adapter is mounted to said camera as compared with a focal length of the objective lens when said detection means does not detect that said stereo adapter is mounted to said camera.

9. The stereo photographing system of claim 8, wherein said control means of said zoom finder sets a focal length of said objective lens of said zoom finder twice as long when said detection means detects that said stereo adapter is mounted to said camera as compared with a focal length of said objective lens when said detection means does not detect that said stereo adapter is mounted to said camera.

10. The stereo photographing system of claim 3 wherein, said camera further comprises:

a variable power lens which is provided in a manner such that said variable power lens can be inserted into and retracted from said finder optical path at a position closer to an object to be taken than a finder field frame provided in said finder, wherein a magnification of said finder is increased when said variable power lens is inserted into said finder optical path;

a means for inserting and retracting said variable power lens into and from said finder optical path; and, a means for actuating said inserting and retracting means to insert and retract said variable power lens into and from said finder optical path when said detection means detects that said stereo adapter is mounted to said camera.

11. The stereo photographing system of claim 10, wherein said variable power lens increases a focal length of an objective lens of said finder by two times.

12. The stereo photographing system of claim 3 wherein, said camera further comprises:

a variable power lens which is provided, in an optical path of said finder, at a position closer to an object to be taken than a finder field frame provided in said finder in a manner such that said variable power lens can move along S finder optical axis, wherein a magnification of said finder is varied when said variable power lens moves along said finder optical axis;

a means for moving said variable power lens along said finder optical axis; and, a means for actuating said moving means to move said variable power lens along said finder optical axis to increase said finder magnification when said detection means detects that said stereo adapter is mounted to said camera.

13. The stereo photographing system of claim 12, wherein said actuating means actuates said moving means to move said variable power lens to increase a focal length of an objective lens of said finder by two times.

14. The stereo photographing system of claim 3, wherein said stereo adapter comprises:

a variable power lens which is formed integral on said stereo adapter and placed in front of said finder to increase a magnification of said finder when said stereo adapter is mounted to said camera.

15. The stereo photographing system of claim 14, wherein a magnification factor of said variable power lens is 2.

16. A stereo photographing system having a stereo adapter for photographing two separate images of a same subject viewed from different points and formed onto one picture frame next to each other; and a camera including a strobe and a finder and a photographing lens to which said stereo adapter can be detachably attached at the front end of said photographing lens, wherein said stereo adapter comprises:

a stereo finder viewing field determining means which is formed integral to said stereo adapter and placed in front of said finder when said stereo adapter is mounted to said camera a strobe illuminating angle narrowing means which is formed integral on said stereo adapter and placed in front of a strobe light emitter of said strobe for narrowing an illuminating angle of said strobe when said stereo adapter is mounted to said camera.

17. A stereo photographing system having a stereo adapter for photographing two separate images of a same subject viewed from different points and formed onto one picture frame next to each other, and a camera including a finder and a photographing lens to which said stereo adapter can be detachably attached at the front end of said photographing lens, wherein said stereo adapter, comprises:

a pair of primary reflecting members for reflecting light from the same subject; and, a pair of secondary reflecting members for reflecting light reflected by said primary reflecting members toward said photographing lens, wherein said primary reflecting members are provided in a manner such that said primary reflecting members are rotatable about axes parallel to each other and each of said axes extending in a direction perpendicular to an imaginary plane which an optical axis of said photographing lens is located on and is perpendicular to said pair of secondary reflecting members to change an angle of an incident light reflected by said primary reflecting members upon said secondary reflecting members.

18. The stereo photographing system of claim 17, further comprising:

a focal length detecting means for detecting a focal length of said photographing lens, wherein said photographing lens is a variable focal length lens; and, a means for rotating said primary reflecting members to change said angle in accordance with a focal length of said photographing lens detected by said focal length detecting means.

19. The stereo photographing system of claims 18, wherein said stereo adapter further comprises a means for detecting a rotational position of said primary reflecting members.

20. The stereo photographing system of claim 17, further comprising:

a distance measuring means for detecting a distance of a subject; and, a means for rotating said primary reflecting members to change said angle in accordance with a distance of said subject detected by said distance measuring means.

21. The stereo photographing system of claims 20, wherein said stereo adapter further comprises a means for detecting a rotational position of said primary reflecting members.

22. A stereo photographing system having a stereo adapter for photographing two separate images of a same subject viewed from different points and formed onto one picture frame next to each other, and a lens-shutter type camera including a finder and a photographing lens to which said stereo adapter can be detachably attached at the front end of said photographing lens, wherein said lens-shutter type camera further comprises:

a means for measuring a distance of a subject;

a focusing means for bringing said photographing lens into an in-focus state in accordance with said subject distance measured by said distance measuring means;

a means for detecting that said stereo adapter is mounted onto said lens-shutter type camera; and, a means for adding a certain distance factor to said subject distance measured by said distance measuring means and for controlling said focusing means to bring said photographing lens into an in-focus state in accordance with an adjusted subject distance equal to said certain distance factor plus said subject distance which is obtained by said adding means, when said detecting means detects that said stereo adapter is mounted to said lens-shutter type camera.

23. A stereo photographing system having a stereo adapter for photographing two separate images of a same subject viewed from different points and formed onto one picture frame next to each other, and a lens-shutter type camera including a finder and a photographing lens to which said stereo adapter can be detachably attached at the front end of said photographing lens, wherein said lens-shutter type camera further comprises:

a distance measuring means including a light emitter and a light receiver for measuring a distance of a subject by projecting an infrared ray upon said subject from said light emitter and receiving a reflected infrared ray from said subject by said light receiver;

a refracting member for refracting a light path of said reflected infrared ray which is provided in a manner such that said refracting member can be inserted into and retracted from a front of said light receiver;

a means for inserting and retracting said refracting member into and from the front of said light receiver:

a means for detecting that said stereo adapter is mounted to the lens-shutter type camera: and, a means for actuating said inserting and retracting means to insert said refracting member into the front of said light receiver when said detection means detects that said stereo adapter is mounted to a lens-shutter type camera.

24. The stereo picture photographing means of claim 23 wherein said refracting member is a prism.

25. A stereo photographing system having a stereo adapter for photographing two separate images of a same subject viewed from different points and formed onto one picture frame next to each other, and a lens-shutter type camera including a finder and e photographing lens to which said stereo adapter can be detachably attached at the front end of said photographing lens, wherein said lens-shutter type camera further comprises a distance measuring means including a light emitter and a light receiver for measuring a distance of a subject by projecting an infrared ray upon said subject from said light emitter and receiving a reelected infrared ray from said subject by said light receiver, and wherein said stereo adapter comprises a refracting member for refracting a light path of said reflected infrared ray which is formed integral on said stereo adapter positioned in front of said light receiver when said stereo adapter Is mounted to said lens-shutter type camera.

26. The stereo picture photographing means of claim 25, wherein said refracting member is a prism.

27. A stereo photographing system having a stereo adapter for photographing two separate images of a same subject viewed from different points and formed onto one picture frame next to each other, and a camera including a finder and a photographing lens to which said stereo adapter can be detachably attached at the front end of said photographing lens, wherein said camera further comprises:

an automatic focusing means for determining a focusing distance;

a means for detecting that the stereo adapter is mounted to said camera; and, a means for fixing said focusing distance determined by said automatic focusing means at a predetermined distance when said detector detects that said stereo adapter is mounted to said camera.

28. A stereo photographing system having a stereo adapter for photographing two separate images of a same subject viewed from different points and formed onto one picture frame next to each other, and a camera including a finder and a photographing lens to which said stereo adapter can be detachably attached at the front end of said photographing lens, wherein said camera further comprises:

an automatic exposure control means including a diaphragm;

a means for detecting that the stereo adapter is mounted on the camera; and, a means for controlling said automatic exposure control means to stop down said diaphragm to a certain size corresponding to a predetermined f-number when said detector detects that the stereo adapter is mounted on the camera.

29. A stereo photographing system, comprising:

a single lens reflex camera including a finder and a photographing lens;

a stereo adapter for photographing two separate images of a common subject viewed from different points and formed onto one picture frame next to each other, said stereo adapter capable of being attached to said photographing lens, wherein said two separate images are viewed through said viewfinder in a viewfinder filed thereof when said stereo adapter is attached to said photographing lens;

means for detecting whether said stereo adapter is attached to said photographing lens; and means for visually enhancing a border line between said two separate images viewed in said viewfinder field when said detecting means detects that said stereo adapter is attached to said photographing lens.

30. The stereo photographing system of claim 29, wherein said enhancing means comprises an LCD plate provided in said viewfinder, said LCD plate including a line segment corresponding to said border line, wherein said line segment is transparent when said detecting means does not detect that said stereo adapter is attached to said photographing lens, wherein said line segment is polarized to become opaque when said detecting means detects that said stereo adapter is attached to said photographing lens.

31. The stereo photographing system of claim 29, wherein said enhancing means comprises means for inserting and retracting a bar member corresponding to said border line into and from a focusing screen in said viewfinder, wherein said inserting and retracting means inserts said bar member into said focusing screen when said detecting means detects that said stereo adapter is attached to said photographing lens, and wherein said inserting and retracting means retracts said bar member from said focusing screen when said detecting means does not detect that said stereo adapter is attached to said photographing lens.

32. A stereo photographing system having a stereo adapter for photographing two separate images of a common subject viewed from different points and formed onto one picture frame next to each other, and a camera including a finder and a photographing lens to which said stereo adapter can be detachably attached to a front end of said photographing lens, wherein said camera further comprises;

means for detecting whether said stereo adapter is attached to said photographing lens; and means for marking a border line between said two separate images formed onto one picture frame when said detecting means detects that said stereo adapter is attached to said photographing lens.

33. The stereo photographing system of claim 32, wherein said marking means comprises means for emitting a line of light to said border line after each exposure when said detecting means detects that said stereo adapter is attached to said photographing lens, said emitting means being placed on a pressure plate of said camera.

34. The stereo photographing system of claim 32, wherein said marking means comprises an LCD plate including a line segment that is placed immediately in front of a film, said line segment being placed to correspond to said border line, wherein said line segment is transparent when said detecting means does not detect that said stereo adapter is attached to said photographing lens, and wherein said line segment is polarized to become opaque when said detecting means detects that said stereo adapter is attached to said photographing lens.

* * * * *